United States Patent [19]

Imoto et al.

[11] Patent Number: 4,755,008
[45] Date of Patent: Jul. 5, 1988

[54] BRAKING SYSTEM WITH POWER BRAKE, BRAKING FORCE PROPORTIONING, ANTI-SKID, AND TRACTION CONTROL FUNCTIONS

[75] Inventors: Yuzo Imoto, Kariya; Haruhiko Uno, Anjou; Toshihiro Takei, Okazaki; Hideo Wakata, Nagoya; Yoshiyuki Hattori, Toyoake, all of Japan

[73] Assignee: Nippondenso Co., Ltd., Kariya, Japan

[21] Appl. No.: 943,771

[22] Filed: Dec. 19, 1986

[30] Foreign Application Priority Data

| Dec. 25, 1985 | [JP] | Japan | 60-295644 |
| Dec. 25, 1985 | [JP] | Japan | 60-295645 |
| Dec. 26, 1985 | [JP] | Japan | 60-295545 |
| Jan. 24, 1986 | [JP] | Japan | 61-14511 |
| Aug. 25, 1986 | [JP] | Japan | 61-198506 |
| Sep. 5, 1986 | [JP] | Japan | 61-210026 |

[51] Int. Cl.⁴ ............................................. B60T 8/04
[52] U.S. Cl. .................................... 303/110; 180/197; 188/181 R; 188/195; 188/349; 303/100; 303/111; 303/116; 303/119; 303/9.69; 303/22.1; 303/24.1; 303/DIG. 4; 303/114
[58] Field of Search ................. 303/111, 113–119, 303/110, DIG. 1–4, 61–63, 68–69, 60, 92, 100, 24, 13, 22; 60/545, 591; 188/345, 195, 181 R, 349; 180/197

[56] References Cited

U.S. PATENT DOCUMENTS

| 4,093,316 | 6/1978 | Reinecke | 303/DIG. 4 |
| 4,575,161 | 3/1986 | Vanzant et al. | 303/110 |
| 4,627,671 | 12/1986 | Matsui et al. | 303/116 |
| 4,630,871 | 12/1986 | Imoto et al. | 303/113 |
| 4,636,009 | 1/1987 | Tsuru et al. | 303/116 X |
| 4,637,664 | 1/1987 | Arikawa | 303/111 |
| 4,685,749 | 8/1987 | Otsuki et al. | 303/116 |
| 4,687,260 | 8/1987 | Matsui et al. | 303/116 X |

Primary Examiner—Douglas C. Butler
Attorney, Agent, or Firm—Cushman, Darby & Cushman

[57] ABSTRACT

A braking system having a pressure modulator which, during normal braking operation, delivers a fluid pressure which is a predetermined multiple of a fluid pressure generated by the master cylinder to a wheel cylinder. The pressure modulator has a solenoid actuator which is energized during braking force proportioning and anti-skid operations to reduce the delivery pressure. In a preferred embodiment, the pressure modulator further includes another solenoid actuator for increasing the delivery pressure during braking force proportioning operation and for delivering fluid pressure during traction control operation.

29 Claims, 15 Drawing Sheets

BRAKING SYSTEM WITH POWER BRAKE, BRAKING FORCE PROPORTIONING, ANTI-SKID, AND TRACTION CONTROL FUNCTIONS

BACKGROUND OF THE INVENTION

1. Field of the Invention

The present invention relates generally to a braking system for a wheeled vehicle. More particularly, the present invention relates to a braking system which provides a function of communicating to wheel cylinders a fluid pressure which is a multiple of a master cylinder pressure, to assist the vehicle operator in applying the brakes (hereinafter power brake function) and a function of proportioning the braking forces of respective brakes in accordance with maximum frictional forces to be developed between the respective wheels and the road surface (hereinafter braking force proportioning function), in addition to anti-skid and traction control functions. The present invention also relates to an electronically controllable pressure modulator for use in a braking system having such functions.

2. Description of the Related Art

Frictional force between a vehicle wheel and a particular road surface is a function of a vertical load imposed upon the wheel perpendicular to the road surface, and of the coefficient of friction between the wheel and the road surface. The load on the wheel, in turn, varies in response to a weight transfer and position of the vehicle. For example, when the vehicle makes a turn, higher loads are imposed on the outer wheels, and thus the inner wheels are subjected to lower loads. Also, during hard braking, the weight of the vehicle is transferred to the front thereof, so that the front wheels are subjected to a higher load than the rear wheels. The vertical load is also dependent on the inclination of the surface on which the vehicle is travelling. The coefficient of friction between the wheels and the road, in turn, depends on the prevailing road surface conditions. It is known that the coefficient of friction is at a maximum when the slip ratio of the wheel is about 15 to 20 percent, as discussed, for example, in a copending U.S. patent application Ser. No. 877,729, filed June 24, 1986 and assigned to the assignee of the present invention.

If the braking force by a brake overcomes the maximum frictional force which can develop between the associated wheel and the road surface, the brake tends to lock the wheel and thereby cause wheel skidding. Also, when a driving torque transmitted to a driven wheel is higher than the maximum frictional force, the driven wheel spins and the wheel traction is decreased.

It is known in the art that a potential wheel skid or wheel spin condition can be eliminated by controlling the brake fluid pressure applied to brake wheel cylinders of skidding or spinning wheels. For example, Japanese Unexamined Patent Publication No. 56-90760, published July 23, 1981, discloses a braking system wherein, during an anti-skid operation, an electronic control unit senses the potential wheel skid condition and causes a modulator valve to close communication between the master cylinder and the brake to reduce the wheel cylinder pressure and restore the rotation of the skidding wheel. When the potential wheel skid condition has been eliminated, the control unit then causes the modulator valve to open communication between an accumulator and the brake to increase the wheel cylinder pressure and retard the rotation of the wheel. In this manner, the wheel cylinder pressure is repeatedly decremented and incremented in sequence at very short time intervals until the vehicle stops or until the emergency braking operation is no longer necessary. During a traction control operation, the control unit senses a potential wheel spin condition and causes the modulator valve to communicate the accumulator with the brake to retard the rotation of the wheel and restore wheel traction.

This braking system also comprises a pressure regulator which regulates the accumulator pressure in such a manner that, during the anti-skid operation, the brake fluid pressure is substantially equal to the fluid pressure generated by the master cylinder. During a traction control operation, the pressure regulator regulates the brake fluid pressure to be a fraction of the accumulator pressure.

Although this system adjusts the brake fluid pressure for acceptable performance during both anti-skid and traction control operations, it is unable to control the braking force of brakes prior to the occurrence of the potential wheel skid condition, since an anti-skid operation is initiated only when a potential wheel skid condition is sensed of at least one wheel. As in most other anti-skid systems, this braking system controls wheel skidding by successively decrementing and incrementing the brake fluid pressure only after the occurrence of the potential wheel skid condition, and no attempt is made to avoid the occurrence of the potential wheel skid condition. Moreover, this system requires a brake booster to assist the operator to apply the brakes during a normal braking or anti-skid operation, since the maximum fluid pressure communicated to the brake is equal to the master cylinder pressure.

Japanese Unexamined Patent Publication No. 48-22879, published Mar. 23, 1973, discloses a power brake device with an anti-skid function. This device includes a vacuum or pneumatic booster which amplifies the master cylinder pressure during a normal braking operation. The device further includes a solenoid operated control piston which reduces the brake fluid pressure during an anti-skid operation. With this device, all of the brake wheel cylinders are supplied with fluid at an equal pressure during the anti-skid operation, so that it is impossible to carry out a separate control of the braking force of each brake.

It is also known in the art to use a proportioning valve to limit fluid pressure to the rear brakes in order to avoid rear wheel skidding that can occur during hard braking because the weight of the vehicle is transferred to the front thereof. However, the proportioning valve is not responsive to road surface conditions or to weight transfer due to centrifugal force exerted when the vehicle turns.

SUMMARY OF THE INVENTION

The primary object of the present invention is to provide a braking system capable of providing the power brake function, as well as the braking force proportioning function wherein the brake fluid pressures are controlled in such a manner that the braking forces at each of the wheels are proportioned in accordance with the maximum available frictional force at each wheel to perform the most efficient braking prior to an imminent wheel skid condition.

Another object of the invention is to provide a braking system that provides the power brake and braking force proportioning functions in addition to the antiskid function.

A further object of the invention is to provide a braking system that provides the power brake and braking force proportioning functions in addition to the anti-skid and traction control functions.

According to one aspect of the invention, the braking system comprises a brake, a master cylinder for generating a controlled fluid pressure, a source of a predetermined fluid pressure substantially higher than the controlled fluid pressure, a reservoir for a brake fluid, and a pressure modulator. The pressure modulator is in fluid communication with the brake wheel cylinder, the master cylinder, the source, and the reservoir and controls the fluid pressure communicated to the wheel cylinder. The pressure modulator includes a valve mechanism that responds to the controlled fluid pressure to control fluid communication between the source and the wheel cylinder and between the cylinder and the reservoir in such a manner that a modulated fluid pressure which is a multiple of the controlled fluid pressure is communicated to the wheel cylinder during a normal braking operation. The pressure modulator also includes an electronically controllable biasing mechanism which, when energized, biases the valve mechanism so that the modulated pressure communicated to the wheel cylinder is reduced. During a normal braking operation, the biasing mechanism remains deenergized so that the modulated pressure, which is a multiple of the master cylinder pressure, is communicated to the wheel cylinder to provide the power brake function. During an anti-skid operation, the biasing mechanism is energized to the maximum intensity so that the wheel cylinder pressure is relieved to eliminate a potential wheel skid condition, whereupon the biasing mechanism is deenergized to increment the wheel cylinder pressure. During the braking force proportioning operation, the biasing mechanism is energized with an intermediate intensity in response to a decreasing load condition or slippery road surface condition so that a reduced modulated fluid pressure is communicated to the wheel cylinder to reduce the braking force of the brake in proportion to the decreasing maximum available frictional force.

According to the second embodiment of the invention, the pressure modulator of the braking system further includes an electronically controllable second biasing mechanism which, when energized, biases the valve mechanism so that, in the absence of the controlled fluid pressure, the source is communicated to the wheel cylinder to apply the brake or, in the presence of the controlled fluid pressure, the modulated fluid pressure communicated to the wheel cylinder is increased to, in turn, increase the braking force. Thus, in addition to the power brake, anti-skid, and braking force proportioning functions, the second embodiment provides a traction control function, wherein upon energization of the second biasing mechanism during a traction control operation, the brake is applied to eliminate the potential wheel spin condition. Also, during the braking force proportioning operation, the second biasing mechanism may be energized to increase the braking force in proportion to the increasing maximum available friction between the wheel and the road surface.

In another aspect, the present invention provides a braking system for providing a braking force proportioning function for a vehicle having at least two wheels. The system comprises: at least two brakes, including wheel cylinders, responsive to a fluid pressure, to retard the rotation of the wheels; a master cylinder actuated by a vehicle operator for generating a controlled fluid pressure; a source of a predetermined fluid pressure substantially higher than the controlled fluid pressure; a reservoir for a brake fluid; and, at least two pressure modulators in fluid communication with the wheel cylinders, master cylinder, source, and reservoir for respectively controlling fluid pressures communicated to respective wheel cylinders. Each of the pressure modulators comprises: valve means responsive to a controlled fluid pressure for controlling fluid communication between the source and associated wheel cylinder and between the reservoir and associated wheel cylinder so that a modulated fluid pressure, which is a multiple of the controlled fluid pressure, is communicated to the associated wheel cylinder during a normal braking operation; electronically controllable first biasing means for biasing the valve means so that the modulated fluid pressure communicated to the associated wheel cylinder is reduced upon energization of the first biasing means; and, electronically controllable second biasing means for controlling fluid communication between the source and the associated wheel cylinder and between the reservoir and the associated wheel cylinder so that the modulated fluid pressure communicated to the associated wheel cylinder is increased upon energization of the second biasing means. The system also comprises sensing means associated with the wheels for sensing load conditions imposed upon respective wheels and delivering signals in accordance with the load conditions, and control means responsive to these signals and cooperating with the first and second biasing means to control the first and second biasing means so that fluid pressures communicated from the pressure modulators to respective wheel cylinders are proportioned in accordance with the load conditions of the wheels during a braking force proportioning operation of the braking system.

These and other objects of the present invention as well as other features thereof will become apparent from the following description.

BRIEF DESCRIPTION OF THE DRAWINGS

Throughout the drawings, equivalent parts and members are indicated by like reference numerals.

DESCRIPTION OF THE PREFERRED EMBODIMENTS

Figure 1:
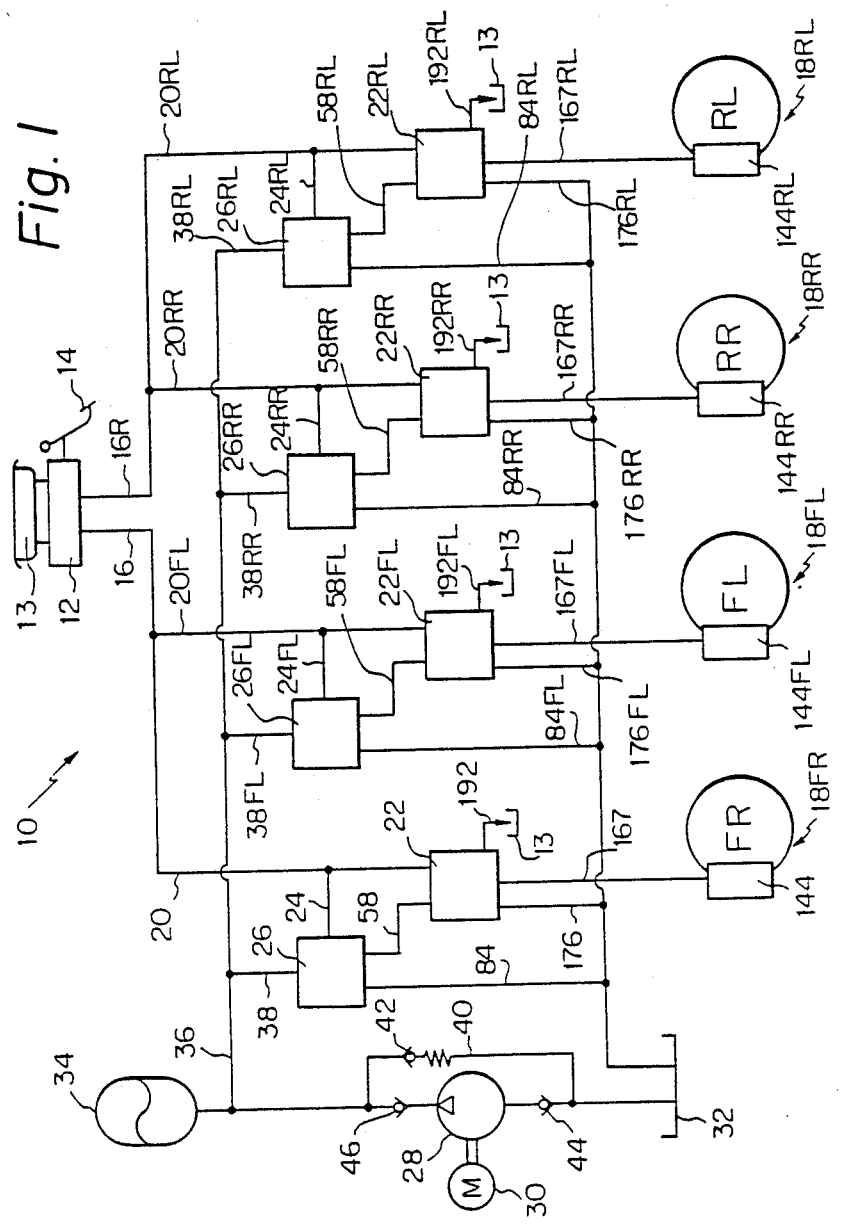
FIG. 1 is a diagram of the braking system according to the first embodiment of the invention.

Referring now to the drawings, the first embodiment of the invention will be described with reference to FIGS. 1-3. Referring to FIG. 1, the braking system 10 illustrated is applicable to a front-engine rear-drive vehicle. The braking system 10 includes a master cylinder 12 which generates a controlled fluid pressure upon actuation of a brake pedal 14 by the vehicle operator. The master cylinder 12 having a reservoir 13 is a conventional tandem type and has two independent pressure chambers connected respectively to a main conduit 16 for front brakes 18FR and 18FL and a main conduit 16R for rear brakes 18RR and 18RL. The main conduit 16 is branched into a branch conduit 20 for the front right brake 18FR and a branch conduit 20FL for the front left brake 18FL. The conduit 20 is connected to a pressure summation device 22 described later. The conduit 20 is also connected via a pilot conduit 24 to a pressure modulator 26 described later.

The system also includes a hydraulic pump 28 driven by an electric motor 30 to draw a brake fluid from a reservoir 32 and pump it to an accumulator 34 for storing a predetermined fluid pressure. The accumulator 34 is designed to store a fluid pressure which is much higher than the maximum pressure generated by the master cylinder. The stored pressure is communicated to a pressure conduit 36 from which a branch conduit 38 connected to the pressure modulator 26 is extended. A relief conduit 40 with a pressure relief valve 42 bypasses the pump 28 to relieve an unusually high delivery pressure of the pump. A pair of check valves 44 and 46 are connected in series with and at both sides of the pump 28.

Figure 2:
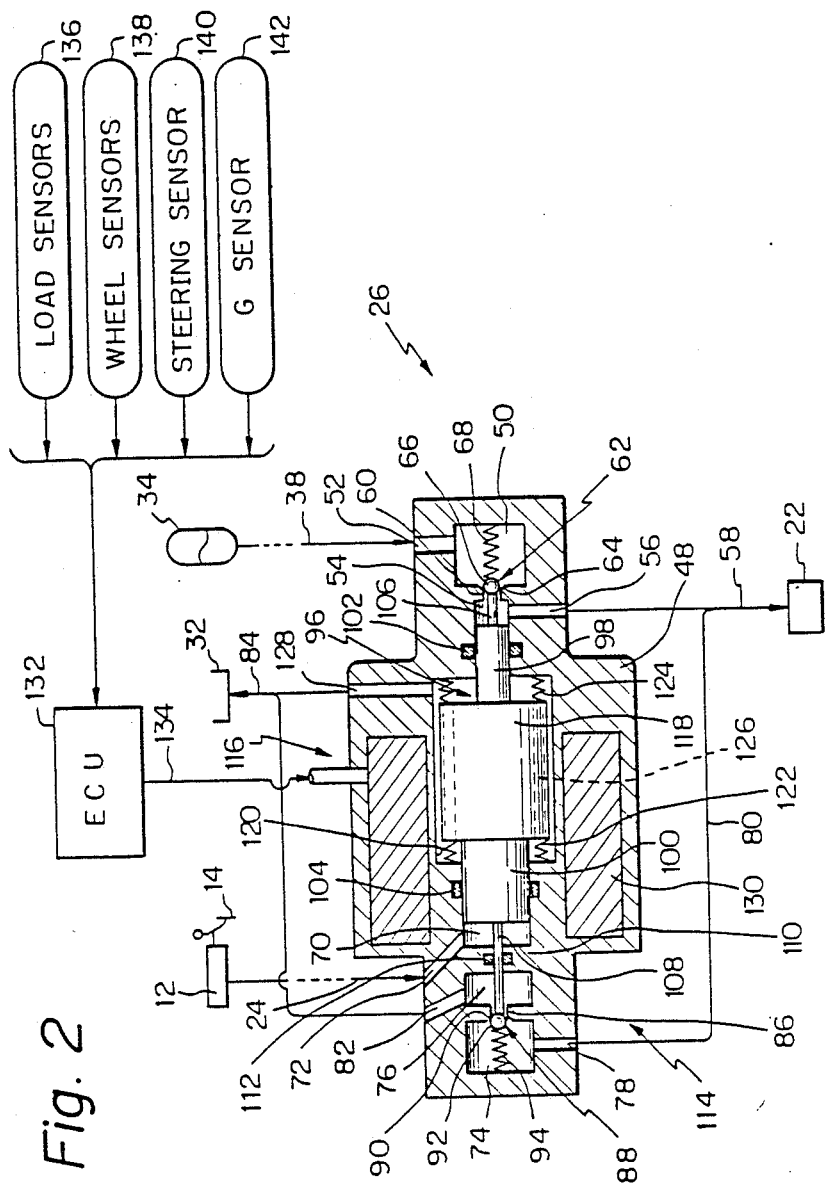
FIG. 2 is a cross-sectional view of the pressure modulator.

Referring to FIG. 2, wherein the pressure modulator 26 is illustrated in greater detail, the modulator 26 has a housing 48 made from a ferromagnetic material. The housing 48 defines an inlet chamber 50 communicated through an inlet port 52 with the accumulator 34. The housing 48 also defines a cylindrical outlet chamber 54 communicated with the pressure summation device 22 through an outlet port 56 and a conduit 58. The inlet chamber 50 is communicated with the outlet chamber 54 through a port 60, which is opened and closed by a first flow control valve 62 comprised of a valve seat 64 and a ball 66 urged by a spring 68 against the valve seat 64. The housing 48 also defines a cylindrical controlled pressure chamber 70 which is communicated via a port 72 with the master cylinder 12 for receiving the controlled fluid pressure therefrom. The housing 48 further defines an output pressure chamber 74 and a low pressure chamber 76. The output pressure chamber 74 is communicated with the outlet chamber 54 through a port 78, a conduit 80, the conduit 58, and the port 56. The low pressure chamber 76 is communicated with the reservoir 32 via a port 82 and a conduit 84. The output pressure chamber 74 is communicated with the low pressure chamber 76 through a port 86 which is opened and closed by a second flow control valve 88 comprised of a valve seat 90 and a ball 92 urged by a spring 94 against the valve seat 90.

The pressure modulator 26 also has a pressure responsive movable valve member 96, which includes a small diameter portion 98 and a large diameter portion 100. The small diameter portion 98 is responsive to the fluid pressure in the outlet chamber 54, while the large diameter portion 100 is responsive to the fluid pressure in the controlled pressure chamber 70. In the illustrated embodiment, the valve member 96 is so sized that the pressure receptive area of the large diameter portion 100 is, for example, four times the pressure receptive area of the small diameter portion 98. It will be understood, therefore, that the hydrostatic force acting on the small diameter portion 98 is counter-balanced by the hydrostatic force acting on the large diameter portion 100 when the fluid pressure in the outlet chamber 54 is four times the fluid pressure in the controlled pressure chamber 70. The portions 98 and 100 are sealed with respect to the housing 48 by O-rings 102 and 104, respectively.

The valve member 96 also includes a rod 106 extending from the small diameter portion 98 and engageable with the ball 66. The valve member 96 also has a rod 108 slidably extending from the large diameter portion 100 through a wall 110 of the housing 48 and into engagement with the ball 92. The lengths of the rods 106 and 108 are selected so that, in the neutral position of the valve member 96, the outer ends of the rods 106 and 108 are brought out of engagement with the respective balls 66 and 92 to permit the balls 66, 92 to seat on respective valve seats 64 and 90 under the action of the springs 68 and 94, thereby interrupting fluid communication between the inlet chamber 50 and the outlet chamber 54 and between the output pressure chamber 74 and the low pressure chamber 76. It will be noted that, if the valve member 96 moves to the right as viewed in FIG. 2, the rod 106 is brought into contact with the ball 66 to move it away from the valve seat 64, to open communication between the chambers 50 and 54 and permit the high pressure fluid in the inlet chamber 50 to flow into the outlet chamber 54, thereby increasing the fluid pressure in the outlet chamber 54. Conversely, when the valve member 96 is moved to the left, the rod 108 is brought into engagement with the ball 92 to open communication between the chambers 74 and 76, thereby allowing the fluid in the outlet chamber 54 to flow toward the reservoir 32 via the port 56, conduit 80, port 78, chambers 74 and 76, port 82, and conduit 84, to reduce the fluid pressure in the outlet chamber 54. An O-ring 112 is provided to seal the rod 108 against the housing wall 110. The valve member 96 and the first and second flow control valves 62 and 88, in combination with the chambers 54 and 70, make up a pressure responsive valve mechanism 114 for controlling fluid communication between the inlet and outlet chambers 50 and 54 and between the output pressure and low pressure chambers 74 and 76 to modulate the output fluid pressure delivered to the pressure summation device 22.

The pressure modulator 26 also includes a solenoid actuator 116 for biasing the valve member 96 to the left as viewed in FIG. 2. The solenoid actuator 116 comprises an armature 118 integral with the movable valve member 96 and received within a chamber 120 defined in the housing 48. A pair of opposite springs 122 and 124 engages the armature 118 to hold the valve member 96 in a neutral position, as shown in FIG. 2. Both sides of the armature 118 are communicated with each other by a plurality of passages 126 formed therethrough. The chamber 120 is communicated through a port 128 to the reservoir 32.

The solenoid actuator 116 also comprises a solenoid coil 130 which is connected to an electronic control unit 132 through a lead wire 134. The control unit 132 receives signals from load sensors 136 associated with a vehicle suspension system for sensing the load conditions at respective wheels, wheel sensors 138 associated with the wheels for sensing the rotational speeds of respective wheels, a steering sensor 140 associated with a steering column for sensing the angle of steering wheels, and a gravity sensor 142 for sensing the centrifugal force exerted by the vehicle, determines the load conditions of the wheels and the potential wheel skid condition, and controls the solenoid actuator 116 in accordance with the load condition and potential wheel skid condition.

The operation of the pressure modulator 26 is as follows.

When the solenoid actuator 116 is deenergized, and when the brake pedal 14 is released so that a fluid pressure is not generated by the master cylinder 12, the springs 122 and 124 hold the valve member 96 in the neutral position t close the first and second flow control valves 62 and 88. In accordance with pressure exerted on the brake pedal, the master cylinder generates a controlled fluid pressure which is communicated to the controlled pressure chamber 70 to move the valve member 96 to the right as viewed in FIG. 2, so that the rod is brought into contact with the ball 66 and moves it away from the valve seat 64 to open communication between the inlet and outlet chambers 50 and 54, whereby the predetermined fluid pressure from the accumulator 34 is allowed to flow into the outlet chamber 54 to increase the pressure therein. At this stage, the small diameter portion 98 receives a hydrostatic force which is equal to the fluid pressure in the chamber 54 multiplied by the pressure receptive area of the portion 98, while the large diameter portion 100 is subjected to a hydrostatic force which is equal to the controlled fluid pressure in the chamber 70 multiplied by the pressure receptive area of the portion 100. The first flow control valve 62 will remain open until the fluid pressure in the outlet chamber 54 is increased to such a level that the leftward force exerted on the small diameter portion 98 is equal to the rightward force exerted on the large diameter portion 100, whereupon the valve member 96 is moved back to the neutral position under the action of the springs 122 and 124 to close the first flow control valve 62. If the fluid pressure in the outlet chamber 54 becomes too high, so that the leftward force overcomes the rightward force, then the valve member 96 is moved to the left, causing the rod 108 to be brought into contact with the ball 92 to move it away from the valve seat 90, whereby the fluid in the outlet chamber 54 is released toward the reservoir to reduce the fluid pressure in the chamber 54. In this manner, the valve member 96 responds to the fluid pressures in the chambers 54 and 70 and cooperates with the first and second flow control valves 62 and 88 to control the fluid pressure in the outlet chamber 54 in such a manner that the leftward force is balanced by the rightward force. In the balanced condition, the fluid pressure in the outlet chamber 54 will be four times as high as the fluid pressure in the controlled pressure chamber 70, because, in the illustrated embodiment, the pressure receptive area of the large diameter portion 100 is four times that of the small diameter portion 98. Thus, when the solenoid actuator 116 is deenergized, the pressure modulator 26 modulates the fluid pressure from the accumulator 34 to a predetermined multiple of the controlled fluid pressure as generated by the master cylinder 12. The modulated fluid pressure is communicated to the pressure summation device 22.

When the control unit 132 energizes the solenoid actuator 116 with a certain intensity, the armature 118 is attracted to the left to impart a certain bias to the valve member 96. This causes the valve member 96 to move to the left so that the second flow control valve 88 is opened to allow communication between the chambers 74 and 76, whereby the fluid in the outlet chamber 54 is released toward the reservoir 32 until the fluid pressure in the outlet chamber 54 is reduced to such a level that the hydrostatic rightward force exerted on the large diameter portion 100 is equal to the solenoid bias plus the hydrostatic leftward force exerted on the small diameter portion 98. In this manner, the fluid pressure communicated to the pressure summation device 22 is reduced in accordance with he magnetic attractive force generated by the solenoid 130. The reduced output pressure transmitted to the pressure summation device 22 may be controlled by varying the electric power supplied to the solenoid 130. When the solenoid 130 is energized with a maximum electric current, the fluid pressure communicated to the pressure summation device 22 will be reduced to zero in a short time period. When electric power having a predetermined intermediate intensity is supplied continuously, the pressure modulator 26 will deliver a predetermined reduced output pressure which is less than the controlled fluid pressure from the master cylinder 12 multiplied four times.

Figure 3:
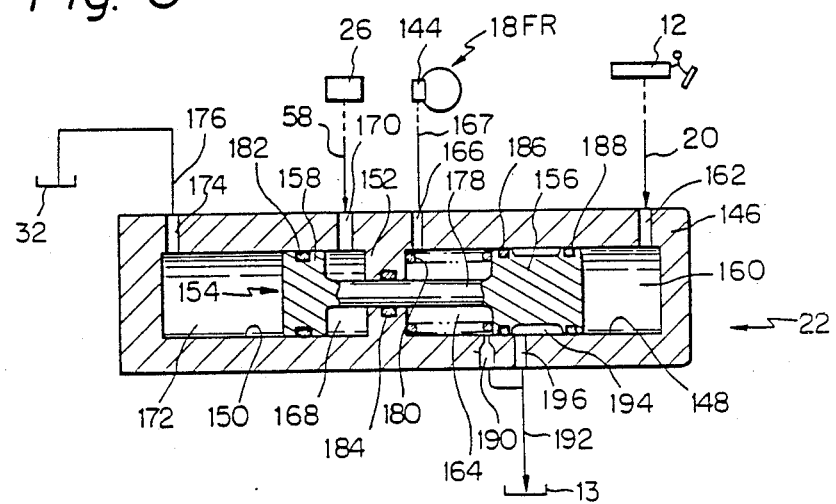
FIG. 3 is a cross-sectional view of the pressure summation device.

FIG. 3 illustrates the pressure summation device 22 in greater detail. This device 22 is designed to receive the controlled fluid pressure from the master cylinder 12 and the modulated fluid pressure from the pressure modulator 26 and communicates the sum of the controlled and modulated fluid pressures to a wheel cylinder 144 of the brake 18FR. The pressure summation device 22 is intended to provide a fail-safe function in that at least the controlled fluid pressure from the master cylinder 12 is communicated to the wheel cylinder 144 to apply the brake even if one or more of the pump 28, accumulator 34, pressure modulator 26, and conduits related thereto, have failed or are malfunctioning.

The pressure summation device 22 comprises a body 146 having aligned cylinder bores 148 and 150 separated by a wall portion 152. The device 22 also includes a double-headed piston 154 having a first head portion 156 slidably fitted within the bore 148 and a second head portion 158 slidably fitted within the bore 150. The first head portion 156 divides the inner cavity of the bore 148 into a controlled pressure chamber 160 communicated through a port 162 with the master cylinder 12 and an output pressure chamber 164 communicated through a port 166 and a pressure conduit 167 with the wheel cylinder 144. The second head portion 158 divides the inner cavity of the bore 150 into a modulated pressure chamber 168 communicated through a port 170 with the outlet port 56 of the pressure modulator 26 and a low pressure chamber 172 connected via a port 174 and a conduit 176 to the reservoir 32. The first and second head portions 156 and 158 are interconnected by a rod portion 178 slidably extending through the wall portion 152. The piston 154 is biased by a spring 180 toward the chamber 160. O-rings 182, 184, 186, and 188 are provided to ensure sealing between the piston 154 and the body 146. A port 190 in the body 146 opens into the output pressure chamber 164 and is connected to a conduit 192 from the reservoir 13 to permit the brake fluid in the reservoir 13 to flow via the chamber 164 into the wheel cylinder 144 when the fluid in the wheel cylinder has been depleted by air bleeding and the like. An annular groove 194 is formed on the first head portion 156 and is connected through a port 196 to the conduit 192.

With this arrangement, the controlled fluid pressure applied from the master cylinder 12 into the chamber 160 and the modulated fluid pressure applied from the pressure modulator 26 into the chamber 168 act on the piston 154 to urge it to the left as viewed in FIG. 3, to pressurize the fluid in the chamber 164 so that the pressure summation device 22 delivers a fluid pressure which is equal to the sum of the controlled fluid pressure and the modulated fluid pressure to the wheel cylinder 144. In the absence of the modulated fluid pressure, only the controlled fluid pressure in the chamber 160 acts on the piston 154, so that the pressure communicated to the wheel cylinder 144 is equal to the pressure from the master cylinder 12.

Returning to FIG. 1, the braking system 10 also comprises, for each of the other brakes 18FL, 18RR and 18RL, components equivalent to those described hereinbefore. In FIG. 1, these equivalent components are indicated by like reference numerals, with a suffix FL for components for the front left brake, a suffix RR for components for the rear right brake, and a suffix RL for components for the rea left brake. A description thereof will not be necessary.

The operation of the braking system 10 will be described below with reference to FIGS. 1-3.

When the brake pedal 14 is released, and thus the master cylinder 12 does not generate a fluid pressure, the valve members 96 of respective pressure modulators 26, 26FL, 26RR, and 26RL are held in the neutral position shown in FIG. 2, so that the pressure modulators do not apply a fluid pressure to the modulated pressure chamber 168 of the pressure summation devices 22, 22FL, 22RR, and 22RL. Therefore, the piston 154 of each of the pressure summation devices is held in the position shown in FIG. 3, so that the wheel cylinders are communicated with the reservoir 13 and the brakes are released.

During a normal braking operation, the fluid pressur generated by the master cylinder 12 is communicated to the controlled pressure chambers 70 of the respective pressure modulators 26, 26FL, 26RR, and 26RL to cause them to deliver to the respective wheel cylinders a modulated fluid pressure which is a predetermined multiple, four times in the illustrated embodiment, of the controlled fluid pressure generated by the mater cylinder 12, as described hereinbefore. Each of the pressure summation devices adds the modulated fluid pressure and the controlled fluid pressure and delivers the summated pressure to each wheel cylinder. In the illustrated embodiment, this summated pressure is five times higher than the controlled fluid pressure. Thus, the brakes are applied to develop an increased braking force which is five times as high as that which would be developed with only the fluid pressure generated by the master cylinder 12. Thus, the power brake function is performed. The braking force by the respective brakes varies in response to the controlled fluid pressure generated by the master cylinder 12 and, hence, in response to the pressure exerted on the brake pedal by the operator. If the pressure modulators fail to issue the modulated fluid pressure to the pressure summation devices due to a failure or malfunctioning of associated components, the brakes are actuated by only the controlled fluid pressure from the master cylinder 12, thus providing a fail-safe function.

During a braking force proportioning operation, the control unit 132 cooperates with the load sensors 136, wheel sensors 138, steering sensor 140, and gravity sensor 142 and senses that, during braking, the maximum available frictional force of a particular wheel or wheels is decreasing due to a decreasing load condition caused by a vehicle turn, hard braking or other load change, or due to aggravated road surface conditions. The control unit then energizes the solenoid or solenoids 130 of the pressure modulator or modulators 26 for that particular wheel or wheels, with a variable intensity proportional to the magnitude of decrease in the maximum available frictional force, in such a manner that the modulated fluid pressure communicated via the pressure summation device or devices to the wheel cylinder or cylinders of the particular wheel or wheels, and hence the braking force of the brake or brakes associated with the particular wheel or wheels, is reduced in proportion to the decrease in the maximum available frictional force. In this manner, the braking force of that particular wheel or wheels is adjusted so that each wheel of the vehicle is subjected to a braking force which is less than or equal to the maximum available frictional force which the wheel is potentially able to absorb.

During an anti-skid operation, the control unit 132 senses a potential wheel skid condition and energizes the solenoids 130 of the pressure modulators 26 for the skidding wheels with a maximum current intensity. Upon energization, the fluid pressure communicated from the pressure modulators to the pressure summation devices rapidly drops to zero, so that the wheel cylinder pressure is reduced to the controlled fluid pressure from the master cylinder 12, thereby reducing the braking force and allowing a restoration of rotation of the skidding wheels. Upon elimination of the wheel skid condition, the control unit 132 then deenergizes the solenoids to cause the pressure modulators to deliver a modulated fluid pressure to the pressure summation devices, thereby increasing the braking force to retard the rotation of the wheels. This reduction and increase in the braking force is repeated, as is well known in the art, until the vehicle stops or until an emergency braking is no longer required.

Figure 4:
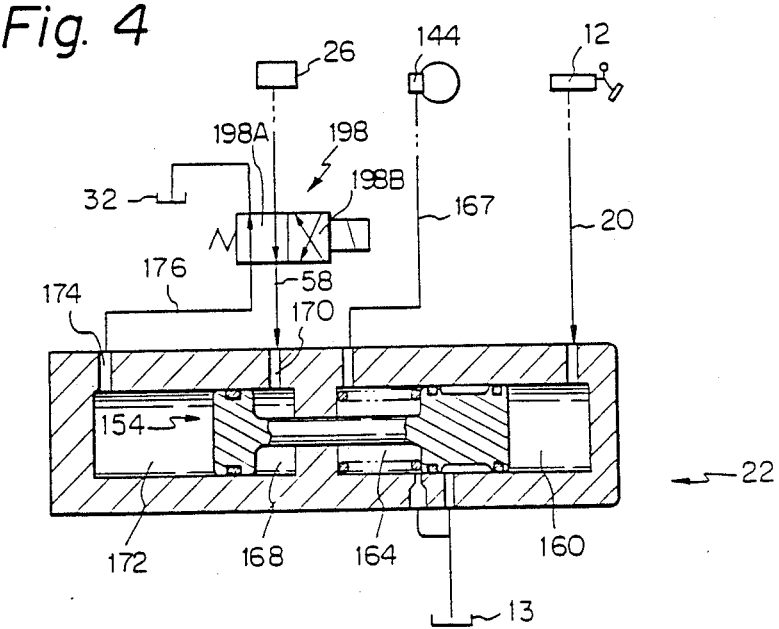
FIG. 4 is a diagram of the modified embodiment.

FIG. 4 illustrates a modified version of the braking system according to the first embodiment shown in FIGS. 1-3. In the first embodiment, during the braking force proportioning and anti-skid operations, the wheel cylinders are supplied with the controlled fluid pressure generated by the master cylinder 12, as long as the operator continues to press down the brake pedal 14, even after the modulated fluid pressure communicated to the pressure summation devices is reduced to zero.

This precludes a reduction of the wheel cylinder pressure to less than the master cylinder pressure in order to considerably decrease the braking force. The modified version shown in FIG. 4 is intended to overcome such a disadvantage. For each of the pressure summation devices, the braking system further includes a solenoid operated switching valve 198 which is disposed across the conduits 58 and 176 and which is controlled by the control unit 132. The valve 198 is a 4-port 2-position valve and has a first or normal position 198A in which the outlet chamber 54 of the pressure modulator 26 is communicated with the output pressure chamber 168 of the pressure summation device 22 and the low pressure chamber 172 is connected to the reservoir 32, and a second position 198B in which the outlet chamber 54 of the modulator is communicated with the low pressure chamber 172 of the device 22 and the output pressure chamber 168 of the device 22 is connected to the reservoir 32.

During a normal braking operation, the switching valve 198 is held in the first position shown in FIG. 4 so that the pressure summation device 22 delivers the sum of the controlled and modulated fluid pressures to the wheel cylinder, as in the first embodiment.

During the braking force proportioning and anti-skid operations, the control unit 132 switches the valve 198 into the second position 198B to communicate the outlet chamber 54 of the modulator 26 with the low pressure chamber 172 of the pressure summation device 22. This causes the modulated fluid pressure from the modulator 26 to be introduced into the low pressure chamber 172, causing the piston 154 to move to the right against the fluid pressure in the controlled pressure chamber 160 and causing the volume of the output pressure chamber 164 to be expanded, thereby reducing the fluid pressure at the wheel cylinder. In this manner, the wheel cylinder pressure is reduced to less than the controlled fluid pressure generated by the master cylinder 12.

Figure 5:
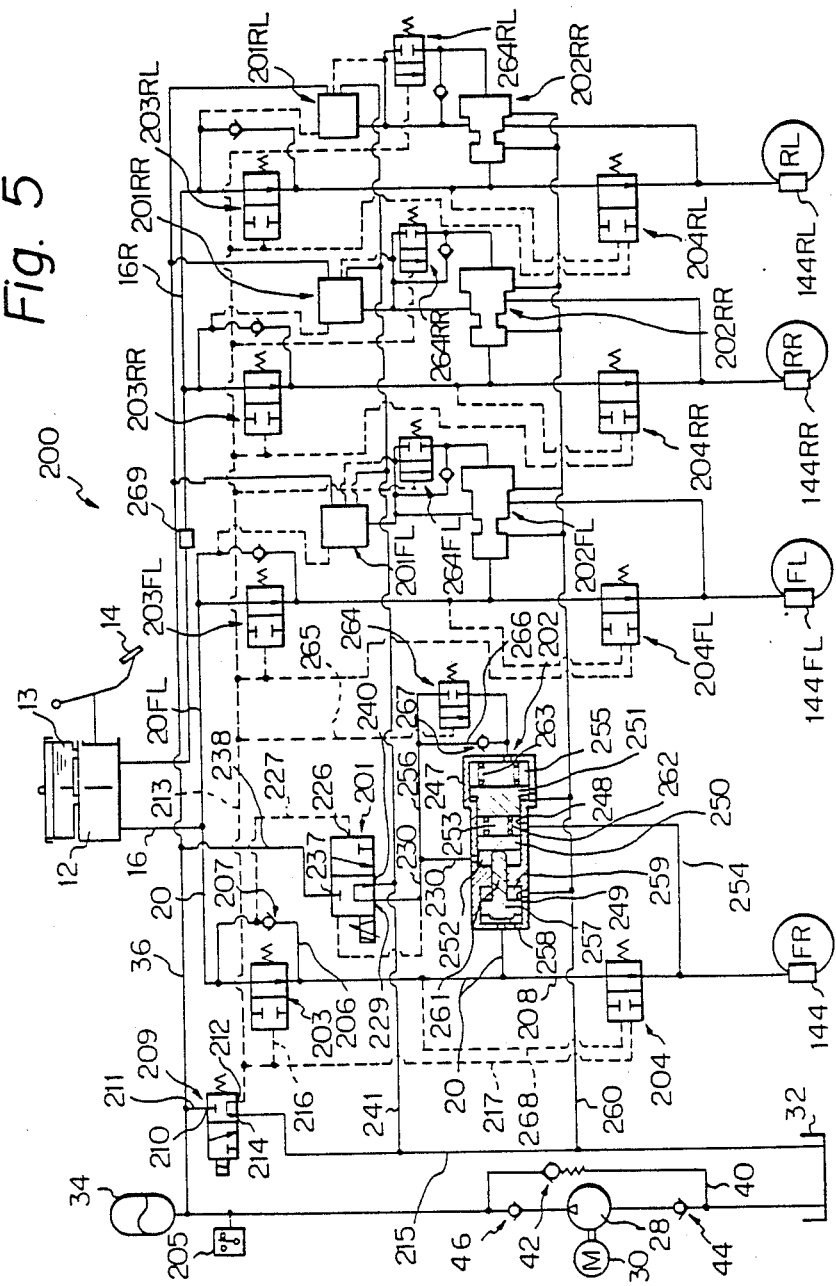
FIG. 5 is a diagram of the braking system according to the second embodiment of the invention.
Figure 6:
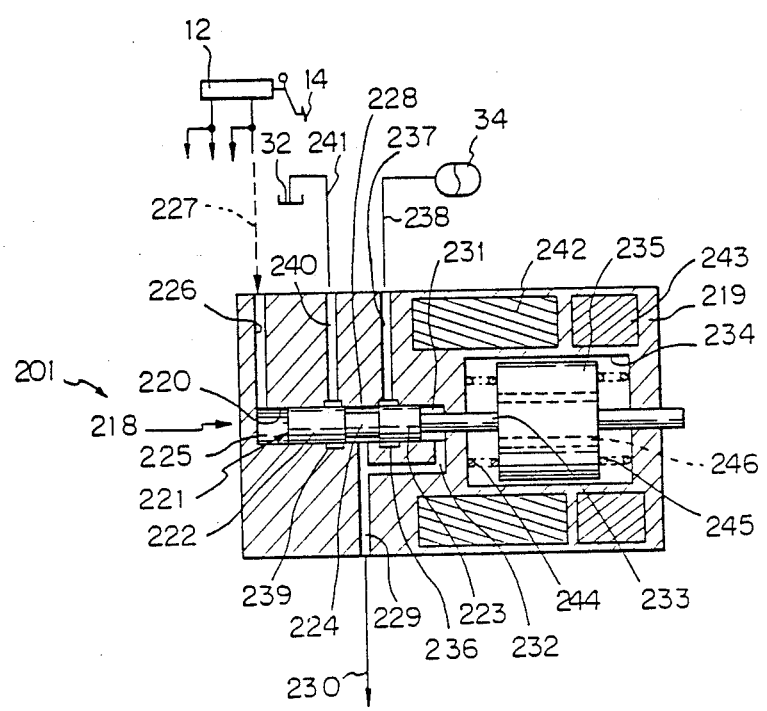
FIG. 6 is a cross-sectional view of the pressure modulator used in the second embodiment.

FIGS. 5 and 6 illustrates the second embodiment of the invention. The braking system 200 according to the second embodiment differs mainly from the first embodiment in that each pressure modulator 201 is provided with a second solenoid actuator and is adapted to generate or increase the wheel cylinder pressure during traction control or a braking force proportioning operation; that each pressure summation device 202 is designed to relieve the wheel cylinder pressure during an anti-skid operation; that a pressure cut-off valve 203 is provided between the master cylinder and the pressure summation device 202; and that a shut-off valve 204 controls fluid communication between the master cylinder 12 and the wheel cylinder. In FIGS. 5 and 6, parts and members equivalent to those of the first embodiment are indicated by like reference numerals and will not be described again. Only the difference will be described below.

Referring to FIG. 5, the braking system 200 includes a pressure sensor 205 for sensing the pressure in the conduit between the pump 28 and the accumulator 34. The electronic control unit similar to that of the first embodiment receives signals from the sensor 205 and operates the pump motor 30 when the accumulator pressure is less than the predetermined pressure.

The front right conduit 20 branched from the front main conduit 16 is provided with the pressure responsive normally-open pressure cut-off valve 203. A conduit 206 with a check valve 207 bypasses the cut-off valve 203. The pressure responsive normally-open shut-off valve 204 is provided in a conduit 208 connecting the conduit 20 and the wheel cylinder 144. These pressure responsive valves 203 and 204 are switched to the closed position by a fluid pressure supplied from a solenoid operated switching valve 209 which is energized by the control unit during an anti-skid and traction control operation. The switching valve 209 has a first port 210 connected via a conduit 211 to the conduit 36, a second port 212 connected to a pressure line 213, and a third port 214 connected to a return line 215. When deenergized, the valve 209 is in the position illustrated, to communicate the pressure line 213 with the return line 215. When energized, the first port 210 is connected to the second port 212 to admit the accumulator pressure into the pressure line 213. The accumulator pressure in the line 213 is transmitted to the pressure responsive valves 203 and 204 via lines 216 and 217 to shift these valves to the closed position.

The pressure modulator 201 shown symbolically in FIG. 5 is illustrated in greater detail in FIG. 6. Referring to FIG. 6, the pressure modulator 201 is made in the form of a pressure-responsive solenoid-operated spool valve 218. The pressure modulator 201 includes a housing 219 defining a bore 220 in which is movably fitted a spool valve member 221 having spool lands 222 and 223 connected with each other by a rod portion 224. The valve member 221 cooperates with the bore 220 to define a controlled pressure chamber 225 communicated via a pilot port 226 and a pilot conduit 227 with the master cylinder 12, an outlet chamber 228 communicated via an outlet port 229 and a conduit 230 with the pressure summation device 202, and an output pressure chamber 231 connected through a passage 232 to the outlet port 229. Thus, the valve member 221 is primarily responsive to the fluid pressures in the chambers 225 and 231. The valve member 221 also has a shaft 233 slidably extending through the wall of the housing 219 into an armature chamber 234 and carrying an armature 235 integral therewith. Due to the presence of the shaft 233, the pressure receptive area of the first spool land 222 is greater than that of the second spool land 223. The pressure receptive area of the first spool land 222 may be, for example, four times that of the second spool land 223. The housing 219 also defines an inlet chamber 236 in the form of an annular groove which is communicated through an inlet port 237 and a conduit 238 with the accumulator 34. The housing 219 also has a low pressure chamber 239 in the form of an annular groove which is communicated through a port 240 and a return conduit 241 with the reservoir 32.

The pressure modulator 201 is provided with a first solenoid coil 242 which is controlled by the control unit and which, when energized, attracts the armature 235 to the left as viewed in FIG. 6. The pressure modulator 201 also has a second solenoid coil 243 which is also controlled by the control unit but attracts the armature 235 to the right when energized. A pair of opposite springs 244 and 245 in the chamber 234 engage the armature 235 to normally hold the valve member 221 in the illustrated neutral position in which the spool lands 222 and 223 interrupt fluid communication between the outlet chamber 228 and the low pressure chamber 239 and between the outlet chamber 228 and the inlet chamber 236, respectively. The armature 235 has a plurality of passages 246 therethrough for communicating both sides of the armature 235.

With this arrangement, when neither the solenoid 242 nor the solenoid 243 is energized, and when the operator releases the brake pedal 14 so that a fluid pressure is not applied to the controlled pressure chamber 225, the valve member 221 is held by the springs 244 and 245 in the neutral position, to interrupt communication between the inlet and outlet chambers 236 and 228. As a result, a fluid pressure is not delivered to the outlet port 229.

When the operator exerts pressure on the brake pedal, the master cylinder 12 generates a controlled fluid pressure which is reflected in the controlled pressure chamber 225 to move the valve member 221 to the right as viewed in FIG. 6, so that the inlet chamber 236 is communicated with the outlet chamber 228 to admit the accumulator pressure into the outlet chamber 228 and raise the fluid pressure therein. The pressure in the chamber 228 is transmitted via the passage 232 into the output pressure chamber 231. As the pressure in the chamber 231 is increased, the valve member 221 is moved to the left until the second spool land 223 interrupts fluid communication between the inlet and outlet chambers 236 and 228. If the pressure in the output pressure chamber 231 is too high, the valve member 221 is moved further to the left until the first spool land 222 opens communication between the outlet and low pressure chambers 228 and 239, whereupon the fluid pressure in the outlet chamber 228 is relieved toward the reservoir 32. In this manner, the valve member 221 is moved to the right or left until the hydrostatic force exerted on the first spool land 222 by the pressure in the controlled pressure chamber 225 is balanced with the hydrostatic force exerted on the second spool land 223 by the pressure in the output pressure chamber 231. Since the pressure receptive area of the first spool land 222 is, for example, four times that of the second spool land 223, the fluid pressure in the output pressure chamber 231 will be, in a balanced condition of the valve member 221, four times the controlled fluid pressure in the chamber 225. Thus, the modulated fluid pressure at the outlet port 229 will be four times the controlled fluid pressure generated by the master cylinder 12, as in the pressure modulator 26 of the first embodiment.

Returning to FIG. 5, the pressure summation device 202 comprises a body 247 having a stepped bore 248 and a separate bore 249. First and third pistons 250 and 251 divide the interior of the stepped bore 248 into a modulated pressure chamber 252 communicated via the conduit 230 with the outlet port 229 of the modulator 201, an output pressure chamber 253 communicated via a conduit 254 with the wheel cylinder 144, and a pressure release chamber 255 communicated via a conduit 256 with the conduit 230. The interior of the bore 249 is divided by a second piston 257 into a controlled pressure chamber 258 in fluid communication with the front conduit 20, and a low pressure chamber 259 communicated with a return conduit 260. The second piston 257 has a rod portion 261 slidably extending through the body wall into the modulated pressure chamber 252 for engagement with the first piston 250. The first and third pistons 250 and 251 are biased to the left by springs 262 and 263. A normally-closed pressure-responsive shut-off valve 264 is disposed across the conduit 256 and is adapted to be brought into the open position in response to a fluid pressure communicated thereto through a conduit 265 branched from the pressure line 213. A conduit 266 with a check valve 267 bypasses the shut-off valve 264. With this arrangement, when the shut-off valve 264 is closed to render the third piston 251 immovable, the pressure summation device 202 issues the sum of the controlled fluid pressure in the chamber 258 and the modulated fluid pressure in the chamber 252 to the output conduit 254.

Also in FIG. 5, the normally-open shut-off valve 204 in the conduit 208 is designed to be responsive also to the controlled fluid pressure from the master cylinder transmitted thereto through a conduit 268.

A similar arrangement is provided for the front left, rear right, and rear left wheel cylinders 144FL, 144RR, and 144RL, and as shown in FIG. 5, the components thereof are indicated by like reference numerals, with suffixes FL, RR, and RL. The hydraulic circuit for the rear brakes differs from that for the front brakes only in that a conventional proportioning valve 269 is provided in the rear main conduit 16R. This proportioning valve 269 is intended to avoid rear wheel skidding by limiting the fluid pressure to the rear wheel cylinders in the event of a malfunction of the anti-skid and braking force proportioning functions.

The mode of operation of the braking system 200 will be described with reference to FIGS. 5 and 6.

When the master cylinder 12 is not operated, the control unit deenergizes the switching valve 209 so that the pressure line 213 is communicated to the reservoir 32, and thus is under ambient pressure. Accordingly, the pressure cut-off valves 203, shut-off valves 204, and shut-off valves 264 are in the normal positions as illustrated. As the valves 203 and 204 are opened, the wheel cylinders are in fluid communication with the master cylinder 12 so that any pressure rise that would otherwise occur in the wheel cylinders due to an elevated temperature condition will be relieved and the wheel cylinders will be replenished with brake fluid as it is depleted.

During a normal braking operation, the switching valve 209 is deenergized so that the pressure cut-off valves 203 and the shut-off valves 264 assume the normally-open and normally-closed positions, respectively. However, since the controlled fluid pressure generated by the master cylinder is applied through the pilot conduits 268 to the shut-off valves 204, causing them to move to the closed position, the fluid communication through the conduits 208 is interrupted. The controlled fluid pressure from the master cylinder 12 is applied to the controlled pressure chamber 225 of each pressure modulator 201 so that the pressure modulator delivers to each pressure summation device 202 a modulated fluid pressure which is a predetermined multiple, four times in the illustrated embodiment, of the controlled fluid pressure, a described hereinbefore. Thus, the power brake function is also performed in this embodiment. The modulated fluid pressure from each pressure modulator 201 is communicated to the modulated pressure chamber 252 of each pressure summation device 202. Since during a normal braking operation the shut-off valves 264 are closed to render the third piston 251 of each device 202 immobile, each pressure summation device 202 issues the sum of the controlled and modulated fluid pressures to the associated wheel cylinder 144, thereby providing a fail-safe function.

During a braking force proportioning operation, the switching valve 209 remains deenergized so that the pressure cut-off valve 203 is opened and the shut-off valve 264 is closed. The shut-off valve 204 is closed due to the controlled fluid pressure from the master cylinder 12. The control unit cooperates with the load sensors, wheel sensors, steering sensor, and gravity sensor, and senses that the maximum available frictional force is decreasing with respect to a particular wheel or wheels and is increasing with respect to the other wheel or wheels, due to a load change or varying road surface condition. For example, when the maximum available frictional force of the inner wheels is decreasing and that of the outer wheels is increasing, due to weight transfer caused by vehicle turning, the control unit energizes the first solenoids 242 of the pressure modulators 201 for the inner wheels and the second solenoids 243 of the pressure modulators for the outer wheels, respectively, with a current intensity proportional to the decrease or increase in the maximum available frictional force of respective wheels. As a result, the valve members 221 of the pressure modulators 201 for the inner wheels are biased to the left as viewed in FIG. 6, so that the valve members are balanced in the neutral position at a reduced fluid pressure in the output pressure chambers 231, thereby reducing the modulated fluid pressure communicated to the pressure summation devices 202 for the inner wheel cylinders, and thus the braking force of the inner wheel brakes is reduced. Conversely, the valve members 221 of the pressure modulators for the outer wheels are biased to the right, whereby the modulated fluid pressure communicated to the pressure summation devices for the outer wheel cylinders is increased to, in turn, increase the braking force of the brakes of the outer wheels. In this manner, the braking force of respective brakes is proportioned in accordance with the maximum available frictional force of respective wheels.

During an anti-skid operation, the control unit senses the potential wheel skid condition and energizes the switching valve 209 to move it into the second position, wherein the accumulator pressure is applied to the pressure line 213 causing the valves 203 and 204 to close and the valves 264 to open. Upon sensing the wheel skid condition, the control unit also energizes the first solenoid 242 of the pressure modulator 201 for the skidding wheel with a maximum current intensity, so that the outlet chamber 228 is brought into full fluid communication with the low pressure chamber 239 thereby connecting the outlet port 229 to the release port 240. This permits the brake fluid in the chambers 252 and 255 to be released toward the reservoir 32, thereby allowing the third piston 152 to move to the right as viewed in FIG. 5 and allowing the first piston 250 to move to the left until it abuts against the rod portion 261 of the second piston 257. As a result, the volume of the output pressure chamber 253 is considerably increased to withdraw the brake fluid in the wheel cylinder to an amount sufficient to cause a rapid reduction in the wheel cylinder pressure. Upon elimination of the potential wheel skid condition, the control unit then deenergizes the second solenoid 242, thereby causing the pressure modulator 201 to deliver the modulated fluid pressure, which is communicated to the pressure summation device 202 to increase the wheel cylinder pressure and to retard the rotation of the wheel. Since during the anti-skid operation the pressure cut-off valve 203 is closed, fluid communication between the master cylinder 12 and the controlled pressure chamber 258 of the pressure summation device 202 is interrupted to hold the second piston 257 at a fixed position. Therefore, a pressure application into and pressure release from the modulated pressure chamber 252 will not cause any movement of the second piston 257, which otherwise would cause a kick-back of the brake pedal 14.

During a traction control operation, upon sensing the potential wheel spin condition, the control unit energizes the switching valve 209, causing the valves 203 and 204 to close and the valve 264 to open. The control unit also energizes the second solenoid 243 of the pressure modulator 201 for the spinning wheel to attract the armature 235 to the right as viewed in FIG. 6, thereby causing the valve member 221 to move to the right to open communication between the inlet and outlet chambers 236 and 228. This permits the fluid pressure from the accumulator 34 to be communicated to the chamber 252 of the pressure summation device 202, so that the first piston 250 is moved under the fluid pressure to displace the fluid in the output pressure chamber 253 toward the wheel cylinder, whereby the brake is applied to eliminate the potential wheel spin condition. In this way, the braking system 200 provides the traction control function, in addition to the power brake, braking force proportioning, and anti-skid functions.

Figure 7:
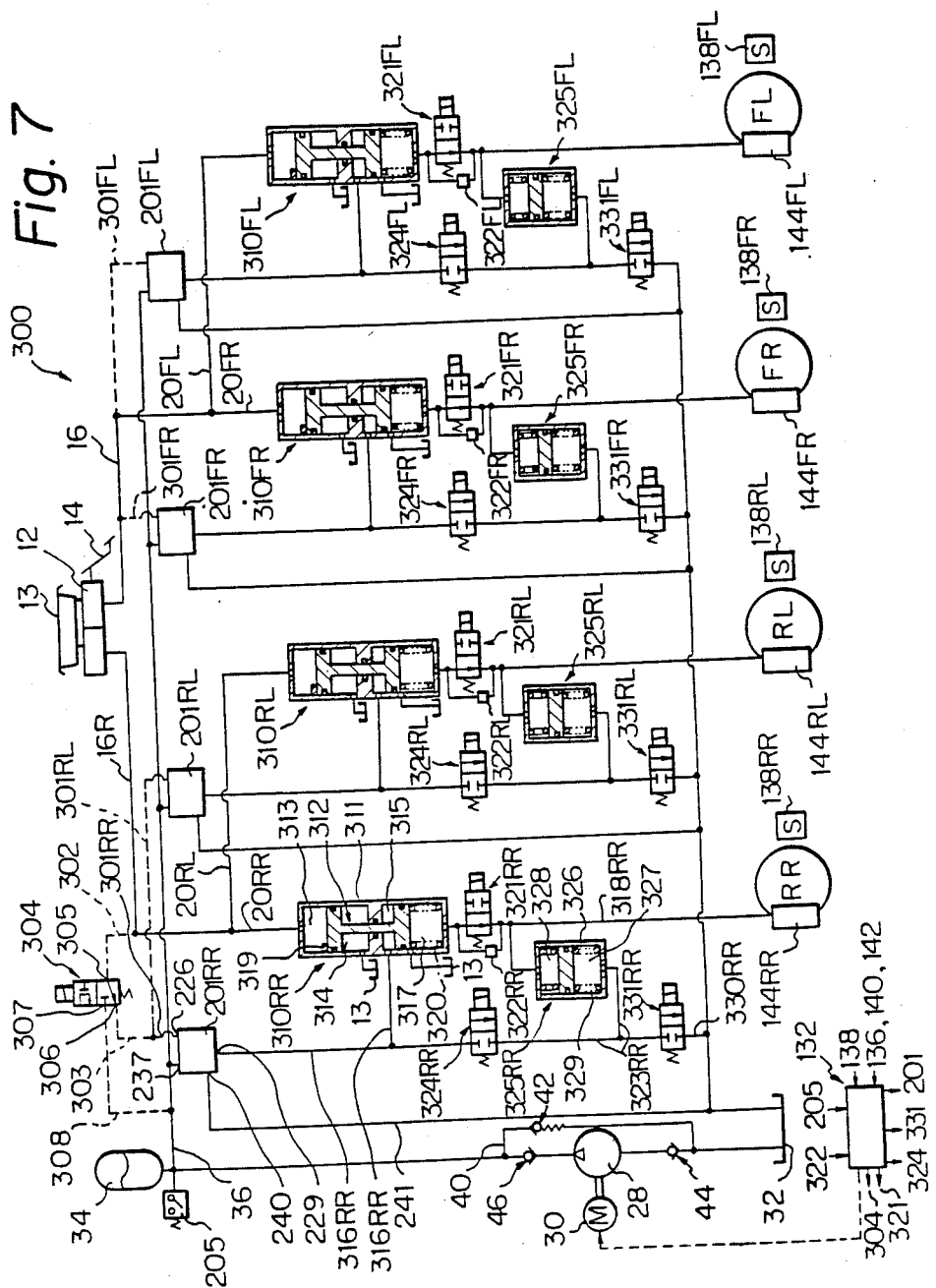
FIG. 7 is a diagram of the third embodiment of the invention.

FIG. 7 illustrates the third embodiment of the invention. Parts and members equivalent to those of the first and second embodiments are shown by like reference numerals and will not be described again.

Referring to FIG. 7, the braking system 300 comprises pressure modulators 201RR, 201RL, 201FR, and 201FL, each of which is identical to the pressure modulator 201 illustrated in FIG. 6 and operates in the same manner as described with reference to FIG. 6. The pilot ports 226 of the pressure modulators 201FR and 201FL for the front wheel cylinders 144FR and 144FL are connected through respective pilot conduits 301FR and 301FL to the front main conduit 16 for receiving the controlled fluid pressure generated by the master cylinder 12. The pilot ports 226 of the pressure modulators 201RR and 201RL for the rear wheel cylinders 144RR and 144RL are connected through a conduit 302, a conduit 303, and pilot conduits 301RR and 301RL to the rear main conduit 16R. A solenoid operated mode change-over valve 304 controlled by the control unit 132 is disposed between the conduits 302 and 303 for communicating the accumulator pressure to the inlet ports 226 of the modulators 201RR and 201RL during traction control operation. The mode change-over valve 303 has a first port 305 connected to the conduit 302, a second port 306 connected to the conduit 303, and a third port 307 connected through a conduit 308 to the conduit 36 from the accumulator 34. The changeover valve 304 is designed in such a manner that, when deenergized, it assumes the first position illustrated, wherein the master cylinder 12 is communicated with the pilot ports 226 of the pressure modulators 201RR and 201RL. When the control unit 132 energizes the valve 304 during the traction control operation, the second and third ports 306 and 307 are communicated with each other to apply the accumulator pressure to the pilot ports 226 of the modulators 201RR and 201RL.

The braking system 300 also includes, for the rear right wheel cylinder 144RR, a pressure summation device 310RR which is similar in function to the pressure summation device 22 shown in FIG. 3. The device 310RR has a housing 311 receiving a double-headed piston 312 therein which cooperates with the housing 311 to define a controlled pressure chamber 313 communicated with the master cylinder 12, a low pressure chamber 314 communicated with the fluid reservoir 13 of the master cylinder, a modulated pressure chamber 315 communicated via a conduit 316RR with the outlet port 229 of the pressure modulator 201RR, and an output pressure chamber 317 communicated through a conduit 318RR with the wheel cylinder 144RR. It will be apparent that the pressure summation device 310RR receives the controlled fluid pressure from the master cylinder and the modulated fluid pressure from the pressure modulator 201RR, and communicates the sum of these fluid pressures to the wheel cylinder 144RR to provide a fail-safe function as in the first embodiment. The pressure summation device 310RR also has a stop 319 which limits the upward stroke of the piston 312 when the latter is moved upward under the action of a spring 320.

The conduit 318RR is provided with a solenoid-operated normally-open first shut-off valve 321RR controlled by the control unit 132. A differential pressure switch 322RR is connected in parallel with the shut-off valve 321RR and is adapted to send a signal to the control unit 132 when there is a pressure difference across the shut-off valve 321RR.

The conduits 316RR and 318RR are connected by a conduit 323RR having a solenoid-operated normally-closed second shut-off valve 324RR controlled by the control unit 132. The conduit 323RR is also provided with a pressure transmission device 325RR disposed downstream of the shut-off valve 324RR. The pressure transmission device 325RR has a body 326 defining an inlet chamber 327 and an outlet chamber 328 and receiving a spring biased movable member 329. The movable member 329 serves to transmit the fluid pressure in the inlet chamber 327 to the outlet chamber 328 without allowing fluid communication between the chambers 327 and 328. Thus, when the second shut-off valve 324RR is opened, the modulated fluid pressure from the outlet port 229 of the pressure modulator 201RR is communicated to the wheel cylinder 144RR via the conduit 323RR and the pressure transmission device 325RR. Use of the pressure transmission device 325RR is preferable to avoid the ingress of air bubbles into the wheel cylinder 144RR in the event that nitrogen gas used in the accumulator 34 inadvertently leaks into the brake fluid in the conduit 36, 316RR and 323RR.

The conduit 323RR is also connected to the reservoir 32 through a release conduit 330RR which is provided with a solenoid-operated normally-closed third shut-off valve 331RR controlled by the control unit 132.

As shown in FIG. 7, similar components are also provided for the other wheel cylinders 144RL, 144FR and 144FL. These components are indicated by like reference numerals, with suffixes RL, FR and FL.

The operation of the braking system 300 is as follows.

Briefly stated, during a normal braking operation each pressure modulator 201 delivers the modulated fluid pressure, which is a predetermined multiple of the controlled fluid pressure generated by the master cylinder 12, to the associated pressure summation device 310, and the pressure summation device 301 delivers the sum of the controlled and modulated fluid pressures to the wheel cylinder. During a braking force proportioning operation, the modulated fluid pressure is reduced or increased in accordance with the maximum available frictional force of associated wheel. During anti-skid and traction control operations, the pressure modulators serve only to supply a fluid pressure which is a multiple of or greater than the controlled fluid pressure to the pressure transmission devices 325. The brake fluid pressure at the wheel cylinders is controlled by the solenoid operated shut-off valves 324 and 331.

More specifically, during non-operation of the braking system wherein the brake pedal is not operated, the master cylinder 12 does not generate a fluid pressure and the first and second solenoids 242 and 243 of each pressure modulator 201 remain deenergized, so that a fluid pressure is not generated at the outlet port 229 of the pressure modulator. The piston 312 of each pressure summation device 310 is urged by the spring 320 into abutment with the stop 319 so that the pressure summation device 310 does not communicate a fluid pressure to the wheel cylinder.

During a normal braking operation, the control unit 132 continues to deenergize the mode change-over valve 304 so that the controlled fluid pressure generated by the master cylinder 12 is communicated equally to the pilot ports 226 of the respective pressure modulators 201. The control unit also continues to deenergize the first and second solenoids 242 and 243 of respective pressure modulators 201 to cause the pressure modulators 201 to deliver the modulated fluid pressure, which is a predetermined multiple of the controlled fluid pressure as described hereinbefore. The shut-off valves 321, 324, and 331 remain deenergized to open fluid communication through the conduit 318 but interrupt communication through the conduits 323 and 330. Thus, the sum of the modulated and controlled fluid pressures is communicated to the respective wheel cylinders 144 to apply the brakes as in the second embodiment.

During a braking force proportioning operation, the mode change-over valve 304, and the shut-off valves 321, 324, and 331 are deenergized. Similar to the second embodiment, the control unit 132 cooperates with the sensors 136, 138, 140 and 142 to sense the increase and decrease in the maximum available frictional force of the respective wheels due to a load change or varying road surface condition. The control unit then selectively energizes the first or second solenoids 242 or 243 of the pressure modulators 201 to proportion the braking force at each different brake in accordance with the actual maximum available frictional forces of respective wheels, as in the second embodiment.

During an anti-skid operation, the control unit 132 senses the potential wheel skid condition and energizes the first shut-off valve 321 for the skidding wheel to interrupt fluid communication between the pressure summation device 310 and the wheel cylinder 144. The mode change-over valve 304 and the second shut-off valve 324 remain deenergized. The control unit energizes the third shut-off valve 331, causing the piston 329 of the pressure transmission device 325 to move toward the inlet chamber 327 and thus relieving the brake fluid pressure at the wheel cylinder 144, to restore the rotation of the skidding wheel. Upon elimination of the potential wheel skid condition, the control unit then deenergizes the third shut-off valve 331 to close the release conduit 330 and energizes the second shut-off valve 324 to open communication through the conduit 323, thereby causing the modulated fluid pressure at the outlet port 229 of the pressure modulator 201 to be transmitted through the pressure transmission device 325 to the wheel cylinder 144 to increment the braking force and to retard the rotation of the wheel. In this manner, in the third embodiment, the wheel cylinder pressure is controlled during the anti-skid operation by controlling the solenoid-operated shut-off valves 324 and 331. This considerably improves the responsiveness of the braking system during anti-skid operation because the solenoid operated valves 324 and 331 respond to control signals from the control unit much quicker than the pressure modulator 201. Another advantage of the braking system 300 is that, during an anti-skid operation, the first shut-off valve is closed to interrupt fluid communication between the output chamber 317 of the pressure summation device 310 and the wheel cylinder 144. As a result, the pressure variation generated in the wheel cylinder during the anti-skid operation does not affect the fluid pressure in the inlet chamber 313 of the pressure summation device 310, so that the piston 312 thereof is rendered immobile. This prevents a kick-back of brake pedal 14 that would otherwise occur during the anti-skid operation due to pressure fluctuations at the wheel cylinder.

When the operator releases the brake pedal during the anti-skid operation, the brake fluid in the inlet chambers 313 of the pressure summation devices is drawn back to the master cylinder, causing the pistons 312 to move toward the inlet chambers 313. This lowers the fluid pressure in the output pressure chambers 317 and generates a differential pressure across the first shut-off valves 321, which are in the closed position. The differential pressure switches 322 sense the pressure difference and send signals to the control unit, which then deenergizes the first shut-off valves 321 to open communication between the output pressure chambers 317 of the pressure summation devices 310 and the wheel cylinders 144, thereby allowing a release of the brake fluid pressure at the wheel cylinders. After sensing that rotation of the wheels is not retarded for a predetermined time period, the control unit then deenergizes the second and third shut-off valves 324 and 331 to terminate the anti-skid operation.

During a traction control operation, upon sensing the potential wheel spin condition of a particular driven wheel, for example, the rear right wheel, the control unit 132 energizes the mode change-over valve 304 to move it into the second position wherein the fluid pressure at the accumulator 34 is applied to the pilot port 226 of the pressure modulator 201RR to move the valve member 221 in such a manner that the inlet port 237 of the pressure modulator is communicated to the outlet port 229. The control unit also energizes the first and second shut-off valves 321RR and 324RR to close the first valve 321RR but open the second valve 324RR, whereby the fluid pressure at the outlet port 229 of the pressure modulator is communicated through the conduit 323RR and the pressure transmission device 325RR to the wheel cylinder 144RR to apply the brake for the rear right driven wheel to eliminate the potential wheel spin condition. If the wheel cylinder pressure is too high, so that the rotation of the rear right wheel is excessively retarded, the control unit then closes the second shut-off valve 324RR and opens the third shut-off valve 331RR to relieve the brake fluid pressure. In this manner, the wheel cylinder pressure for the driven wheel brakes is regulated during a traction control operation by controlling the second and third shut-off valves 324 and 331.

Figure 8:
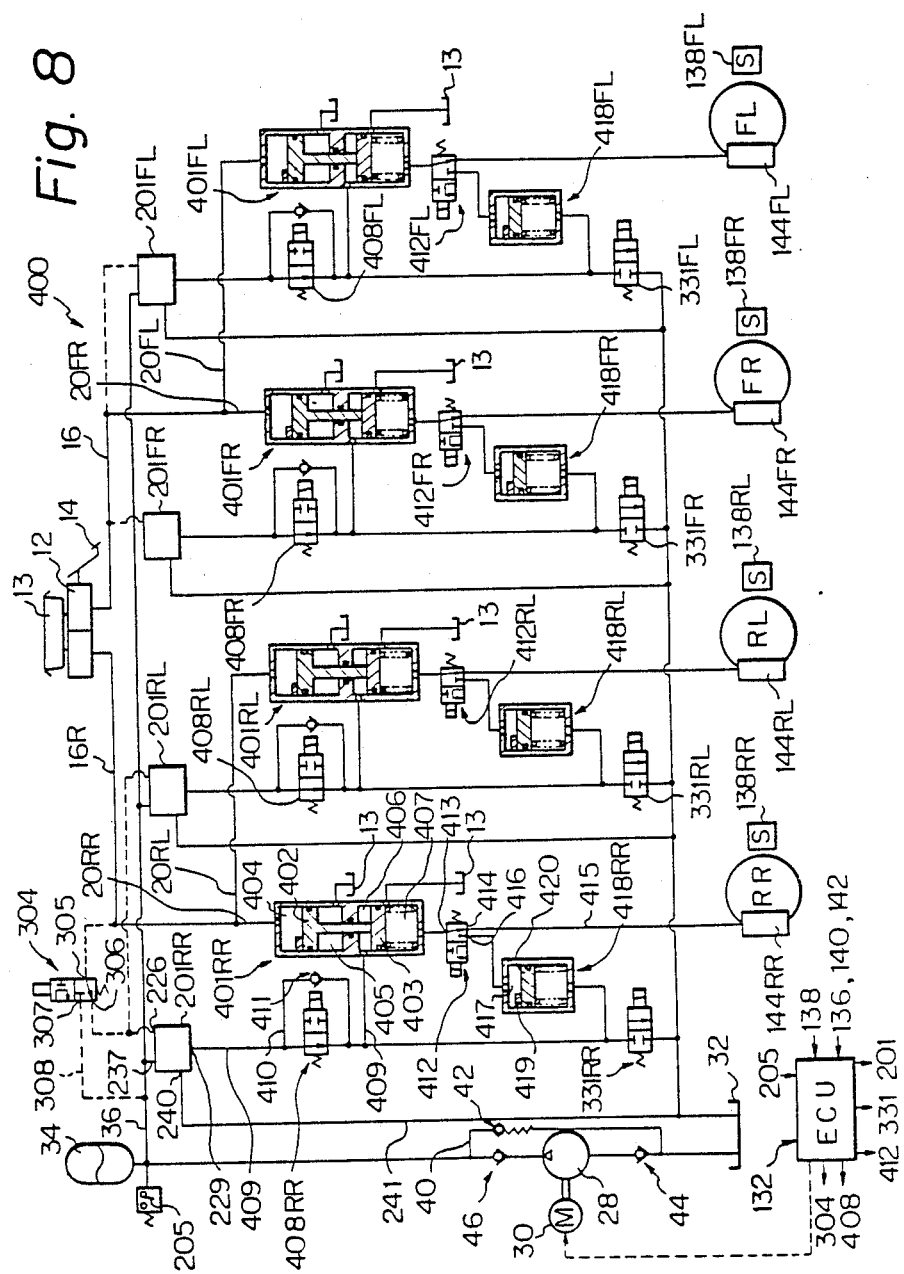
FIG. 8 is a diagram of the fourth embodiment of the invention.

FIG. 8 shows the fourth embodiment of the invention. Parts and members equivalent to those of the preceding embodiments are indicated by like reference numerals and will not be described again. The braking system 400 according to the fourth embodiment is generally similar to the third embodiment shown in FIG. 7 but differs therefrom in several points. First, each of the pressure summation devices 401 includes a first piston 402 and a second piston 403 separate therefrom, instead of the double-headed piston 312 used in the third embodiment. Each pressure summation device 401 defines a controlled pressure chamber 404, a low pressure chamber 405, a modulated pressure chamber 406, and an output pressure chamber 407 similar to the device 310 of the third embodiment. Second, a solenoid-operated normally-open shut-off valve 408 is disposed across the conduit 409 communicating the outlet port 229 of each pressure modulator 201 with the modulated pressure chamber 407 of each pressure summation device 401, and is adapted to be controlled by the control unit 132. A conduit 410 with a check valve 411 bypasses the shut-off valve 408. Third, the normally-open shut-off valves 321 of the third embodiment are replaced with solenoid operated switching valves 412 controlled by the control unit. Each switching valve 412 has a first port 413 communicated with the output pressure chamber 407 of the pressure summation device 401, a second port 414 communicated through a pressure conduit 415 with the wheel cylinder 144, and a third port 416 communicated with an outlet chamber 417 of each pressure transmission device 418. In the deenergized first position of the valve 412, the first and second ports 413 and 414 are communicated with each other to connect the output pressure chamber 407 of the pressure summation device 401 to the wheel cylinder. When energized, the switching valve 412 is moved into the second position in which the second and third ports 414 and 416 are connected with each other to communicate the wheel cylinder with the outlet chamber 417 of the pressure transmission device 418. Each pressure transmission device is provided with a stop 419 for limiting the movement of a spring-biased piston 420.

During normal braking and braking force proportioning operations, the solenoid operated valves 304, 331, 408, and 412 are deenergized to assume the first position as illustrated, and the braking system 400 operates in the same manner as in the third embodiment.

During an anti-skid operation, the switching valve 412 associated with the skidding wheel is energized to move into the second position and the wheel cylinder pressure is incremented and decremented by controlling the shut-off valves 408 and 331.

During a traction control operation, the mode change-over valve 304 is energized as in the third embodiment. The fluid pressure at the outlet port 229 of the pressure modulator 201 is communicated through the normally-open shut-off valve 408 into the modulated pressure chamber 406 of the pressure summation device 401. This causes only the second piston 403 to move toward the output pressure chamber 407. The pressurized fluid in the chamber 407 is communicated through the switching valve 412 and the conduit 415 to the wheel cylinder to retard rotation of the spinning driven wheel. The fluid pressure at the wheel cylinder may be varied by controlling the shut-off valves 408 and 331 and the switching valve 412. That is, the wheel cylinder pressure may be decremented by energizing the valves 408, 412, and 331. To increment the pressure, the valves 408, 412, and 331 are deenergized.

Figure 9:
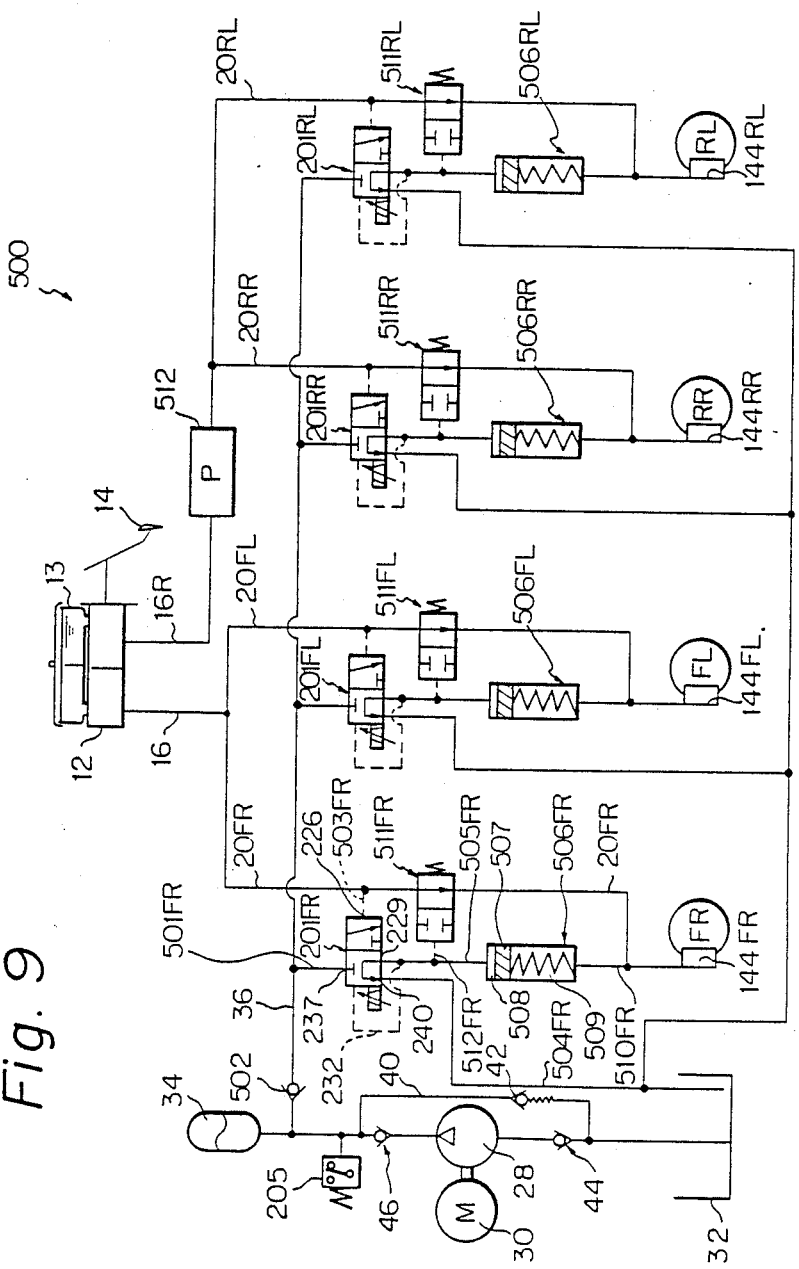
FIG. 9 is a diagram of the fifth embodiment of the invention.

FIG. 9 illustrates the fifth embodiment of the invention. Parts and members equivalent to those of the preceding embodiments are shown by like reference numerals. The primary feature of the fifth embodiment is that the fail-safe function is provided by pressure-responsive shut-off valves. Another major feature is that the braking system also provides the traction control function.

Referring to the brake circuit for the front right wheel cylinder 144FR, the braking system 500 comprises a pressure modulator 201FR which is identical in structure and operation to the modulator 201 shown and described with reference to FIG. 6. The inlet port 237 of the modulator 201FR is connected through an inlet conduit 501 to the conduit 36 having a check valve 502. The pilot port 226 is communicated through a pilot conduit 503FR for receiving the controlled fluid pressure generated by the master cylinder 12. The pressure release port 240 is connected to the reservoir 32 via a return conduit 504FR. The outlet port 229 is communicated via a conduit 505FR to a pressure transmission device 506FR. This device 506FR is identical in structure and in function to the pressure transmission device 325 shown in FIG. 7 and includes a spring biased movable member 507 defining an inlet chamber 508 and an outlet chamber 509 which is connected through a conduit 510FR to the wheel cylinder 144FR. A pressure-responsive normally-open shut-off valve 511FR is disposed across the conduit 20FR. This valve 511FR is responsive to the modulated fluid pressure communicated thereto through a pilot conduit 512FR and is adapted to be moved into the second closed position when a predetermined level of fluid pressure is present at the outlet port 229 of the pressure modulator 201FR.

The brake circuits for the front left, rear right, and rear left wheel cylinders 144FL, 144RR and 144RL are similar to the brake circuit for the front right wheel cylinder 144FR, with the exception that the rear main conduit 16R has a conventional proportioning valve 512.

The braking system 500 operates as follows.

During a normal braking operation, the controlled fluid pressure generated by the master cylinder 12 causes each pressure modulator 201 to deliver the modulated fluid pressure which is a predetermined multiple of the controlled fluid pressure to the outlet port 229. Each shut-off valve 511 responds to the modulated fluid pressure and is changed to the second closed position wherein fluid communication between the master cylinder and the wheel cylinder through the conduit 20 is interrupted. The modulated fluid pressure at the outlet port 229 is transmitted through the pressure transmission device 506 to the wheel cylinder 144 to apply the brake.

In the event that, due to a failure or malfunctioning of the accumulator 34 or related components, the accumulator pressure is not high enough to cause the pressure modulators 201 to deliver the modulated fluid pressure at a preset level, the pressure-responsive valves 511 are returned to the normally open position thereby communicating the controlled fluid pressure generated by the master cylinder 12 to the respective wheel cylinders. Although in this situation the power brake function is not achieved, nevertheless, the brakes are applied by the fluid pressure from the master cylinder, thereby providing the fail-safe function.

During the braking force proportioning operation, the first and second solenoids 242 and 243 of the respective pressure modulators 201 are energized with an electric power intensity proportional to the decreasing and increasing maximum available frictional force of the respective wheels, in such a manner that the fluid pressure communicated through the pressure transmission devices 506 to the respective wheel cylinders 144, and hence, the braking force of the respective brakes, is proportioned in accordance with the maximum available frictional force, as described hereinbefore with reference to FIG. 6. It will be understood that the fail-safe function is also provided by the pressure-responsive valves 511 during the braking force proportioning operation.

During an anti-skid operation, the fluid pressure communicated from the pressure modulator to the wheel cylinder of the skidding wheel is controlled by repeatedly energizing with the maximum current intensity the first and second solenoids 242 and 243 of the pressure modulator for the skidding wheel, as described before.

Similar to the second embodiment, the traction control function is performed by energizing the second solenoid 243 of the pressure modulator for the spinning driven wheel. The fluid pressure generated by the pressure modulator is transmitted through the pressure transmission device 506 to the wheel cylinder to eliminate the wheel spin condition.

Figure 10:
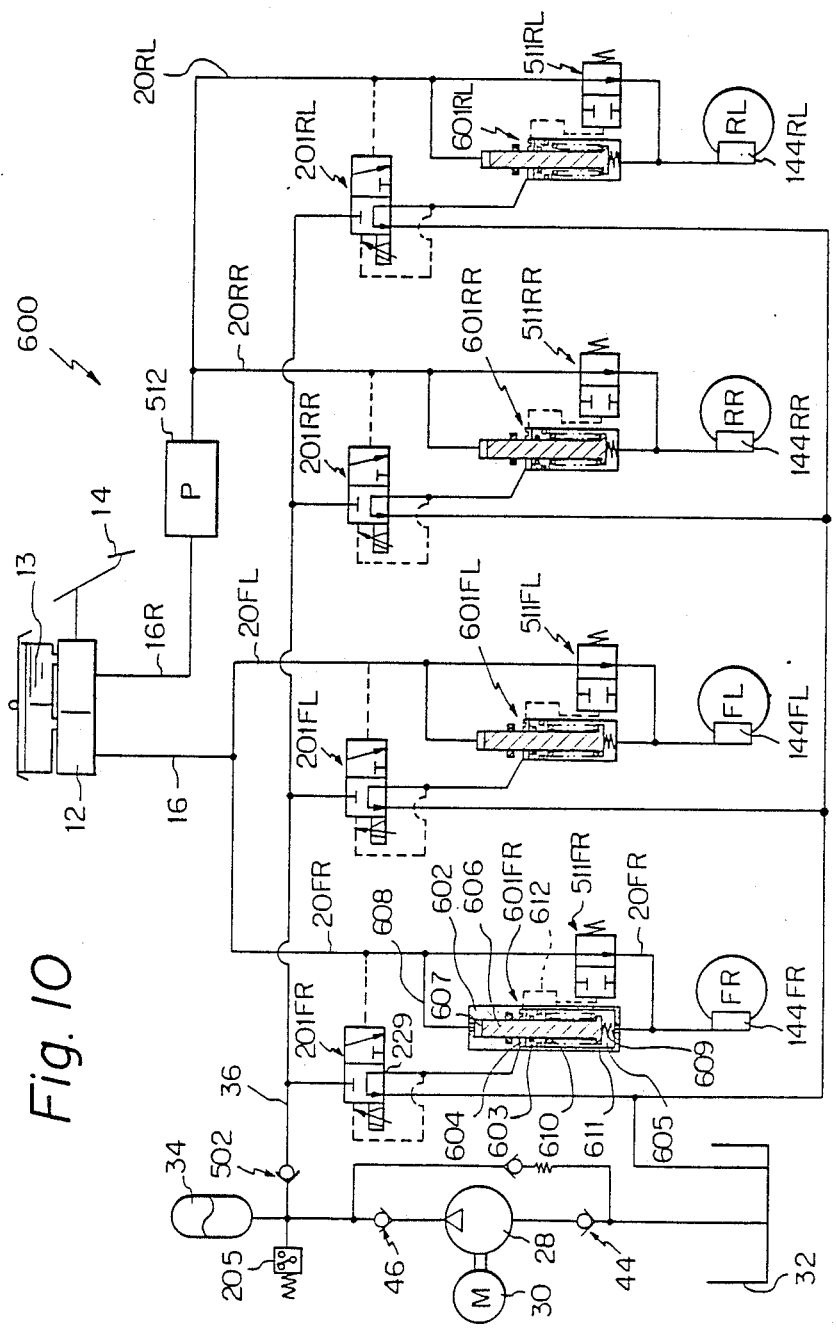
FIG. 10 is a diagram of the sixth embodiment of the invention.

FIG. 10 shows the sixth embodiment of the invention. It will be noted that in the braking system 500 shown in FIG. 9, the fluid communication between the master cylinder 12 and respective wheel cylinders 144 is interrupted by the pressure-responsive valves 511 when the master cylinder 12 is operated to cause the pressure modulators 201 to deliver the modulated fluid pressure to the output conduits 505. This causes a part of the brake fluid to be locked in the conduits 16 and 20, thereby preventing further movement of the brake pedal 14. The sixth embodiment is intended to provide the operator with an improved brake pedal feeling in that the brake pedal 14 is resiliently moved in response to the foot pressure.

Referring to FIG. 10, the braking system 600 differs from the braking system 500 in that each pressure transmission device incorporates a variable volume chamber device. For example, the pressure transmission device 601FR for the front rear wheel cylinder 144FR comprises a body 602 having a stepped bore comprised of a large diameter section and a small diameter section. A movable member 603 is slidably fitted within the large diameter section and defines therein an inlet chamber 604 communicated to the outlet port 229 of the pressure modulator 201FR and an outlet chamber 605 communicated to the wheel cylinder 144FR. A plunger 606 is slidably fitted within the small diameter section and slidably extends through the movable member 603 into the outlet chamber 605. The plunger 606 defines a variable volume chamber 607 communicated through a conduit 608 and the conduits 20FR and 16 to the master cylinder 12. The plunger is biased toward the variable volume chamber 607 by a spring 609, while the movable member 603 is biased toward the inlet chamber 604 by a spring 610 held between the movable member 603 and a spring seat 611 formed at the lower end of the plunger 606. In this embodiment, the fluid pressure to the pressure-responsive shut-off valve 5121FR is applied thereto from the inlet chamber 604 through a pilot conduit 612. The pressure transmission devices 511FL, 511RR, and 511RL for the other wheel cylinder are designed identically to the device 511FR.

When pressure is exerted on the brake pedal 14 to cause the master cylinder 12 to generate the controlled fluid pressure, the pressure-responsive valves 511 are moved into the closed position to interrupt communication between the master cylinder 12 and the wheel cylinders as in the fifth embodiment. The fluid pressure from the master cylinder 12 is also communicated through the conduits 608 to respective variable volume chambers 607, causing the plungers 606 to move in response to the controlled fluid pressure against the action of the spring 609. In this way, any variation in the foot pressure exerted on the brake pedal 14 is converted to the movement of the plungers 606, thereby ensuring a certain amount of brake pedal travel. This improves the brake pedal feeling.

When the modulated fluid pressure is applied from the outlet ports 229 of respective pressure modulators to respective inlet chambers 604 of the pressure transmission devices 511, causing the movable members 603 to move toward the outlet chambers 605, the movement of the movable members 603 is transmitted through the springs 610 to the plungers 606, causing the plungers to move accordingly. As a result, the volume of the variable volume chambers 607 is increased, thereby admitting the brake fluid from the master cylinder 12 and increasing the brake pedal travel.

Figure 11:
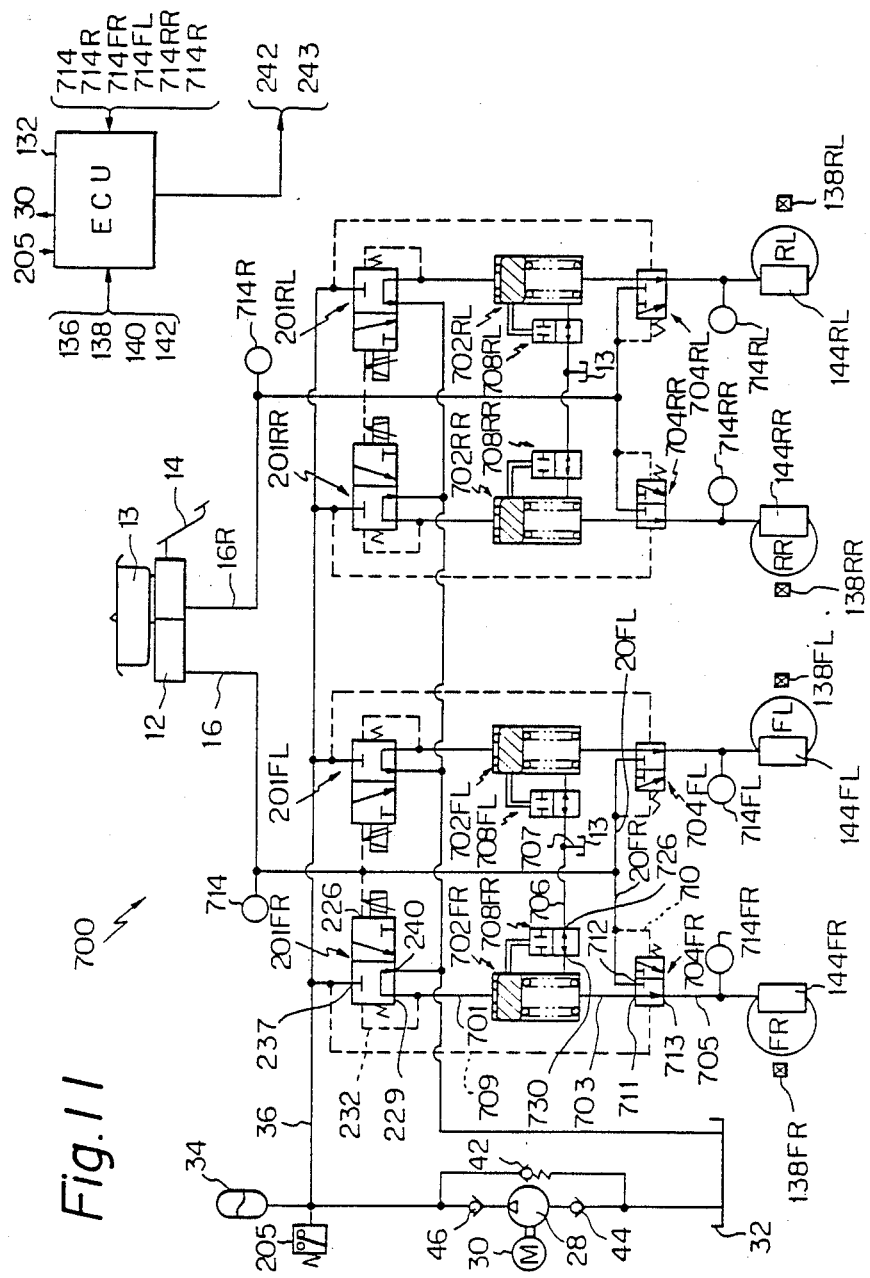
FIG. 11 is a diagram of the seventh embodiment of the invention.

FIG. 11 shows the seventh embodiment of the invention. This braking system 700 generally differs from the fifth embodiment shown in FIG. 9 in that the fail-safe function is provided by pressure-responsive switching valves and that means are provided to communicate the wheel cylinders to the master cylinder reservoir 13 when the system is not operational. Parts and members equivalent to those of the preceding embodiments are indicated by like reference numerals and will not be described again. Referring to the brake circuit for the front right wheel cylinder 144FR, the pressure modulator 201FR is identical to that shown in FIG. 6. The fluid pressure at the outlet port 229 of the pressure modulator 201FR is transmitted to the wheel cylinder 144FR through a conduit 701, a pressure transmission device 702FR, a conduit 703, a pressure-responsive switching valve 704FR, and a conduit 705. The outlet chamber of the pressure transmission device 702FR is communicated via conduits 706 and 707 with the reservoir 13 of the master cylinder 12. A normally-open cut-off valve 708FR which is moved by the movable member of the pressure transmission device 702FR is disposed across the conduit 706. The switching valve 704FR is a 3-port 2-position valve which is changed over in response to the pressure difference between the accumulator pressure transmitted through a line 709 and the controlled fluid pressure communicated through a line 710. The switching valve 704FR has a first inlet port 711, a second inlet port 712, and an outlet port 713. When the valve 704FR is in the first position as illustrated, the first inlet port 711 is connected to the outlet port 713 to communicate the fluid pressure from the pressure transmission device to the wheel cylinder. When the valve 704FR is shifted to the second position, the second inlet port 712 is connected to the outlet port 713 to communicate the controlled fluid pressure generated by the master cylinder 12 to the wheel cylinder 144FR.

The brake circuits for the front left, rear right, and rear left wheel cylinders 144FL, 144RR, and 144RL are similar to the front right brake circuit described. In this embodiment, the braking system 700 further includes pressure sensors 714, 714R, 714FR, 714FL, 714RR, and 714RL for sensing the fluid pressure in the main conduits and wheel cylinders.

Figure 12:
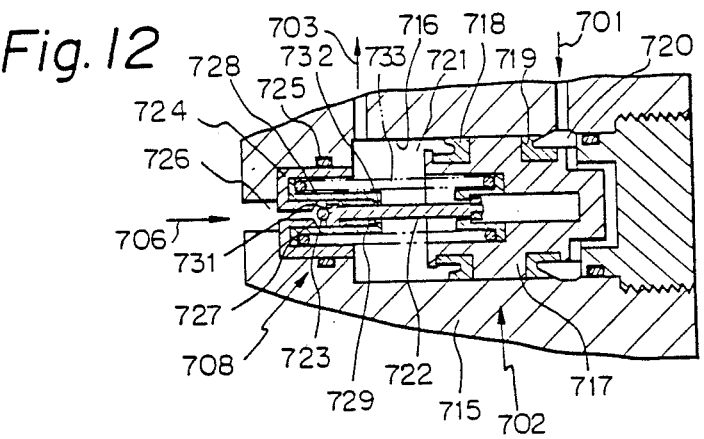
FIG. 12 is a cross-sectional view showing examples of the pressure transmission device and the cut-off valve arranged in a common housing.

FIG. 12 shows an example of a layout wherein the pressure transmission device 702 and the cut-off valve 708 are arranged within a common housing. The common housing 715 has a cylinder bore 716 in which a movable member 717 with sealing rings 718 and 719 is slidably fitted. The movable member 717 cooperates with the bore 716 to define therein a inlet chamber 720 and an outlet chamber 721. The movable member 717 holds an end of a link rod 722, the other end of which extends across the outlet chamber 721 toward the cut-off valve 708 and carries a ball 723 of the cut-off valve 708. The valve 708 also includes a valve seat member 724 which is accommodated within the housing 715 through an O-ring 725. The valve seat member 724 is generally cup-shaped and has a first port 726 extending through the bottom thereof. The valve seat member 724 has a valve seat 727 which cooperates with the ball 723 to open and close the port 726. The valve seat member 724 supports a generally tubular rod holder 728 which slidably receives the link rod 722. A spring 729 is disposed between the rod 722 and the rod holder 728 to bias the ball 723 into engagement with the valve seat 727. A second port or passage 730 is formed between the valve seat 727 and the outlet chamber 721 of the pressure transmission device. This port 730 includes an axial groove 731 formed on the head of the rod 722, an annular chamber receiving the spring 729, and a clearance 732 formed between the rod holder 728 and the rod 722. A spring 733 is arranged between the movable member 717 and the rod holder 728 to bias the movable member 717 away from the cut-off valve 708. This spring 733 has a greater spring force than the spring 729.

With this arrangement, when the movable member 717 is moved in response to the fluid pressure communicated from the outlet port 229 of the pressure modulator 201 into the inlet chamber 720 of the pressure transmission device 702, the ball 723 of the cut-off 708 is brought into contact with the valve seat 727 to close the port 726 and to interrupt fluid communication between the fluid reservoir 13 and the outlet chamber 721.

Figure 13:
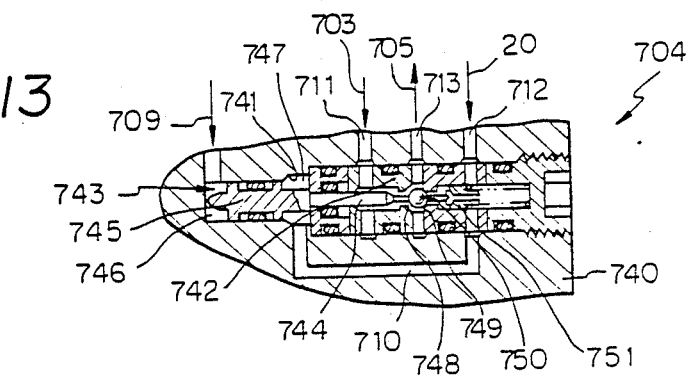
FIG. 13 is a cross-sectional view showing an example of the pressure responsive switching valve.

FIG. 13 illustrates an example of the pressure-responsive switching valve 704. The valve 704 has a housing 740 defining a stepped bore 741. A valve seat member 742 is interference fitted in the large diameter section of the bore 741, and a pressure-responsive movable member 743 is slidably fitted within the small diameter section. The movable member 743 has a rod portion 744 movably extending into the valve seat member 742 and a pressure receptive portion 745 which is subjected to the fluid pressure in pilot chambers 746 and 747. The chamber 746 is communicated with the conduit 709 to introduce therein the predetermined fluid pressure from the accumulator 34. The chamber 747 is communicated through the pilot conduit 710 with the inlet port 712 so as to reflect therein the controlled fluid pressure generated by the master cylinder 12. The housing 740 and the valve seat member 742 are provided with the first inlet port 711, the second inlet port 712, and the outlet port 713. The valve seat member 742 defines a first valve seat 748 located between the first inlet port 711 and the outlet port 713. The valve seat member 742 also defines a second valve seat 749 arranged opposite to the first valve seat 748 and disposed between the second inlet port 712 and the outlet port 713. A ball 750 is received between the first and second valve seats 748 and 749 and is attached to the inner end of the movable member 743. The ball 750 cooperates with the valve seats 748 and 749 to open and close fluid communication between the first inlet port 711 and the outlet port 713 and between the second inlet port 712 and the outlet port 713. The ball 750 is biased toward the first valve seat 748 by a spring-biased plunger 751 received in the valve seat member 742.

It will be understood that when the accumulator 34 and related components function properly, so that the fluid pressure applied through the pilot conduit 709 into the pilot chamber 746 is higher than the controlled fluid pressure applied into the opposite pilot chamber 747 through the passage 710, the movable member 743 is moved to the right as viewed in FIG. 13, bringing the ball 750 into engagement with the second valve seat 749, whereby the outlet chamber 721 of the pressure transmission device 702 is connected to the wheel cylinder 144 to transmit the modulated fluid pressure to the wheel cylinder. When for any reason the fluid pressure from the accumulator 34 becomes lower than the fluid pressure generated by the master cylinder 12, the differential pressure between the chambers 746 and 747 causes the movable member 743 to move to the left, thereby bringing the ball 750 into sealing contact with the first valve seat 748 to communicate the second inlet port 712 to the outlet port 713. In this manner, in the event of a failure or malfunction of the accumulator or related components, the switching valves are changed over to the second position to communicate the controlled fluid pressure generated by the master cylinder 12 to respective wheel cylinders, thereby providing the fail-safe function.

Referring to FIG. 11, during normal braking, braking force proportioning, anti-skid, and traction control operation, the braking system 700 according to the seventh embodiment operates in generally the same manner as the braking system 500 shown and described with reference to FIG. 9, except that the fail-safe function is provided by the pressure-responsive switching valves 704.

During a non-operating state of the braking system 700, the cut-off valves are in the open position so that each wheel cylinder is communicated with the master cylinder reservoir 13 via the conduit 705, the conduit 703, the outlet chamber 721 of the pressure transmission device 702, the conduit 706, and the conduit 707. Thus, the wheel cylinders are under ambient pressure. Therefore, if for any reason the wheel cylinders or the pressure transmission devices are heated, causing expansion of the brake fluid in the wheel cylinders or in the outlet chambers 721 of the pressure transmission devices, the brake fluid is released toward the fluid reservoir 13 to prevent the brakes from being inadvertently applied.

Similarly, if the brake fluid in the wheel cylinders and the outlet chambers 721 of the pressure transmission devices 702 are reduced or depleted for any reasons, a quantity of brake fluid is supplied thereto from the reservoir 13.

Upon actuation of the brake pedal to cause the pressure modulator 201 to issue the modulated fluid pressure to the pressure transmission devices 702, the movable members 743 of the respective pressure transmission device bring the cut-off valves 708 into the closed position, thereby interrupting fluid communication between the reservoir 13 and the wheel cylinders.

Figure 14:
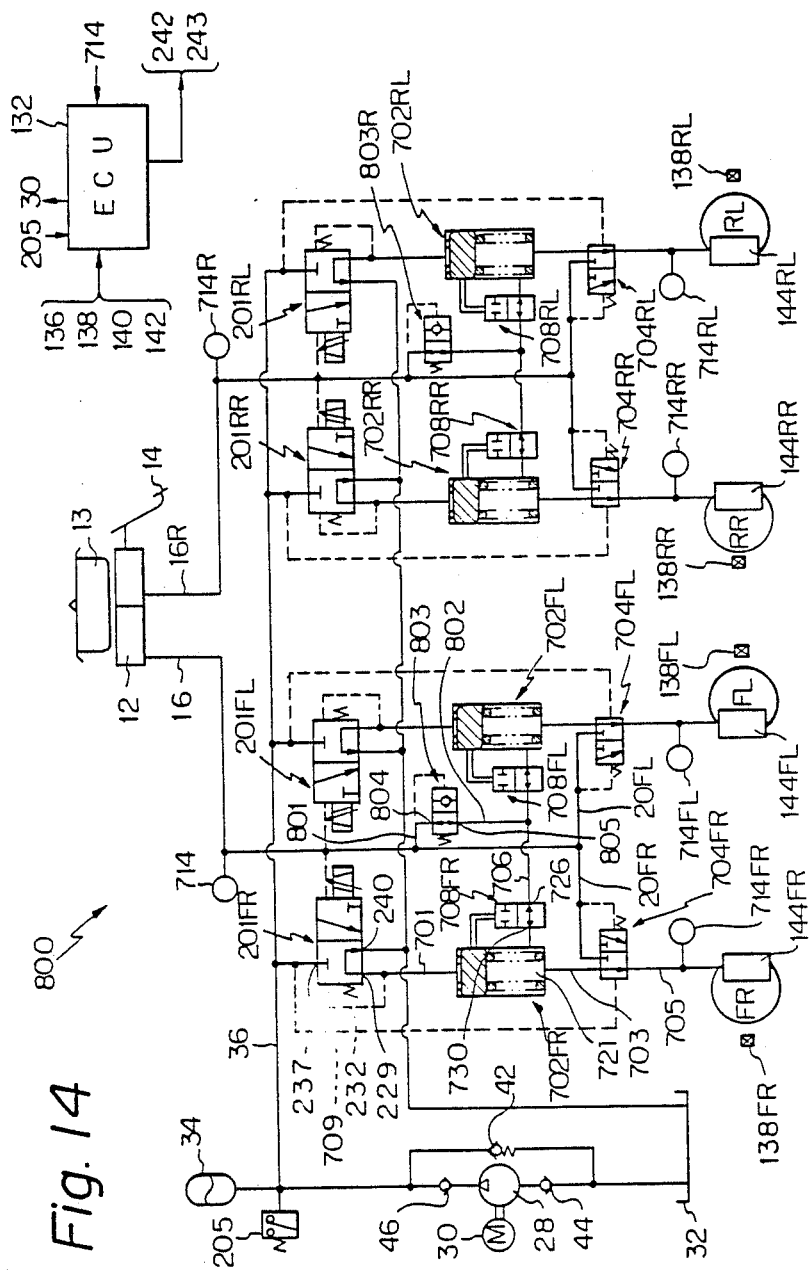
FIG. 14 is a diagram of the eighth embodiment of the invention.

FIG. 14 illustrates the eighth embodiment of the invention. The braking system 800 differs from the system 700 according to the seventh embodiment in that it comprises second cut-off valves for opening fluid communication between the master cylinder 12 and the wheel cylinders during a non-operating state of the system. In FIG. 14, parts and members equivalent to those of the preceding embodiments are shown by like reference numerals and will not be described again. Referring to the brake circuits for the front wheel cylinders 144FR and 144FL, the front main conduit 16 is connected to the conduit 706 through conduits 801 and 802. A pressure-responsive second cut-off valve 803 with a check valve is disposed between the conduits 801 and 802. The cut-off valve 803 has an inlet port 804 and an outlet port 805. A similar cut-off valve 803R is provided for the brake circuits for the rear wheel cylinders 144RR and 144RL.

Figure 15:
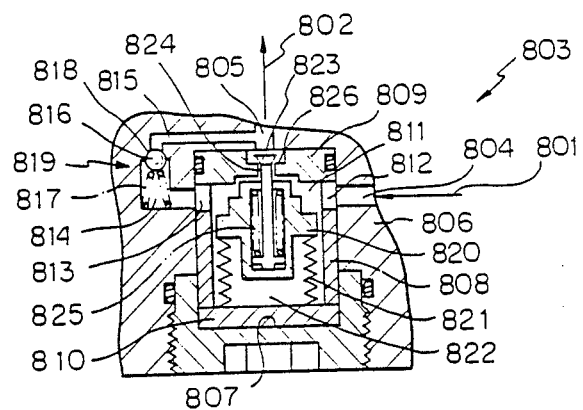
FIG. 15 is a cross-sectional view showing a preferred form of the cut-off valve as used in the eighth embodiment of the invention.

FIG. 15 shows in greater detail the preferred form of the second cut-off valve 803. The valve 803 has a housing 806 defining a bore 807 communicated with the inlet and outlet ports 804 and 805. The bore 807 receives therein a tubular side wall member 808 sandwiched between a valve plate 809 and a bottom plate 810 to define an inner cavity 811. The inner cavity 811 is communicated with the inlet port 804 via an opening 812 formed through the side wall member 808. The cavity 811 is also connected through an opposite opening 813 with a valve chamber 814 which, in turn, is connected through a passage 815 with the outlet port 805. A check ball 816 is accommodated within the valve chamber 814 and is biased by a spring 817 against a valve seat 818 to form a check valve 819.

A movable member 820 is received in the cavity 811 and is fluid-tightly connected to a metallic bellows 821. The movable member 820, the bellows 821, and the bottom plate 810 together define a sealed chamber 822 in which a gas under a predetermined pressure is sealed. The movable member 820 slidably receives the lower end of a poppet valve 823, the upper part of which extends through a passage 824 in the valve plate 809. The poppet valve 823 is biased by a spring 825 against the bottom of the movable member 820. The poppet valve 823 cooperates with a valve seat 826 to control fluid flow through the passage 824.

When the fluid pressure generated by the master cylinder 12 and transmitted through the conduit 801 into the cavity 811 is lower than a preset magnitude, e.g., 1 kg/cm$^2$G, the bellows 821 is allowed to expand to hold the movable member 820 in the uppermost position in which the poppet valve 823 is moved away from the associated valve seat 826 to open fluid communication between the inlet port 804 and the outlet port 805 via the passage 824. In this position of the cut-off valve 803, each wheel cylinder 144 is communicated with the master cylinder 12 through the conduit 705, the conduit 703, the outlet chamber 721 of the pressure transmission device 702, the conduit 706, the conduit 802, the conduit 801, and the main conduit 16, thereby avoiding any inadvertent pressure rise at the wheel cylinder as well as ensuring replenishment of the brake fluid.

When the fluid pressure in the cavity 811 becomes greater than the preset level, the bellows 821 is depressed against the gaseous pressure in the chamber 822 to bring the poppet valve 823 into engagement with the valve seat 826. In this position, the brake fluid is permitted to flow only from the conduit 802 to the conduit 801. Since the second cut-off valve 803 is changed over into the second position in response to even a slight pressure rise at the master cylinder 12, the fluid communication between the master cylinder 12 and the wheel cylinders is interrupted upon actuation of the brake pedal 14, even in a situation in which the first cut-off valve 708 would remain open due to a delay in the pressure rise at the outlet port 229 of the pressure modulator. This prevents the outlet chamber 721 of the pressure transmission device 702 from being supplied with an excessive amount of brake fluid from the master cylinder 12. Thus, the wheel cylinder pressure may be quickly decremented during anti-skid operation.

Figure 16:
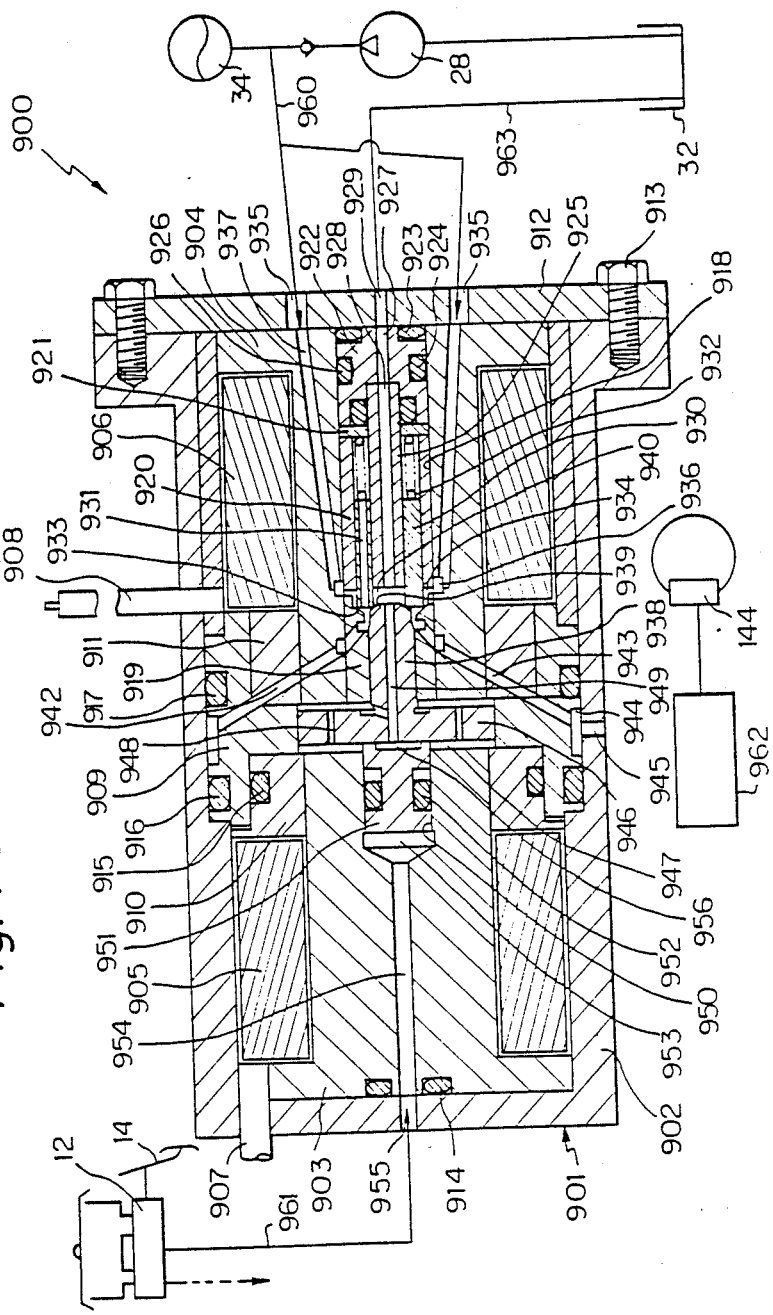
FIG. 16 is a cross-sectional view of another form of the pressure modulator.

FIG. 16 illustrates another form of the pressure modulator which may be used in the braking system according to the invention in place of the pressure modulator 201 shown in FIG. 6. The pressure modulator 900 includes a housing 901 having an outer shell 902 which receives a first housing part 903 and a second housing part 904, both made from a ferromagnetic material. The housing parts 903 and 904 are axially spaced apart to form a gap therebetween. These housing parts 903 and 904 are provided with first and second solenoid windings 905 and 906, respectively, which may be connected through lead wires 907 and 908 to the control unit, not shown.

A yoke member 909, made from a ferromagnetic material, is disposed between the first and second housing parts 903 and 904. A pair of spacer rings 910 and 911, made from a non-magnetizable material, are positioned at opposite sides of the yoke member 909. The members 903, 910, 909, 911, and 904 are held together by an end plate 912 fastened to the outer shell 902 by a plurality of screws 913. Sealing members such as O-rings 914 through 917 are used to provide fluid-tight sealing between the members of the housing 901.

The second housing part 904 has an axial bore 918 therethrough in which a first sleeve 919 and a second sleeve 920 are closely fitted. As will be apparent from FIG. 16, the inner diameter of the second sleeve 920 is greater than that of the first sleeve 919. The right-hand end of the bore 918 is closed by a ring 921 and a holder 922. The holder 922 is loosely fitted within the bore 918. Elastomeric rings such as O-rings 923 and 924 are provided to seal the holder 922 with respect to the housing part 904 and the end plate 912, while permitting the holder 922 to move slightly with respect to the housing part 904, to accommodate any minor misalignment therebetween.

The holder 922 resiliently supports a tube 925 through an elastomeric ring 926. It will be understood that the elastomeric ring 926 serves to accommodate any misalignment of the axis of the tube 925 with respect to the axis of the bore 918. The holder 922 and the tube 925 respectively have aligned central return passages 927 and 928 therethrough communicated with a return port 929 in the end plate 912.

A tubular valve piston 930 is slidably and closely fitted between the second sleeve 920 and the tube 925. The valve piston 930 has a plurality of passages 931 therethrough extending parallel to the axis of the piston 930 and opening into both sides thereof. A coil spring 932 is provided between the valve piston 930 and the ring 921 to urge the valve piston 930 against a valve seat 933 formed at an end of the first sleeve 919. When the valve piston 930 is brought into engagement with the valve seat 933, an annular inlet chamber 934 is defined by the valve piston 930, the first and second sleeves 919 and 920, and the second housing part 924. This inlet chamber 934 is communicated to inlet ports 935 in the end plate 912 via an annular groove 936 and a plurality of inlet passages 937 formed in the second housing part 904.

A first sensing piston 938 is slidably and closely fitted within the first sleeve 919. The first sensing piston 938 is provided at its right-hand end with a conical valve seat 939 which cooperates with the inner edge of the valve piston 930 to define a low pressure chamber 940 and an annular outlet chamber 941. The pressure receptive area of the first sensing piston 938 is determined by the piston cross-sectional area which is exposed to the fluid pressure in the outlet chamber 941 and which is defined between the outer diameter of the sensing piston 938 and the circular line of contact as the conical valve seat 939 is brought into engagement with the inner edge of the valve piston 930. The outlet chamber 941 is communicated through at least two passages 942 and 943 to an annular groove 944 which, in turn, is communicated with an outlet port 945 in the outer shell 902.

The first sensing piston 938 has an integral disk-shaped armature portion 946 which is movably accommodated within an armature chamber 947 defined by the yoke member 909 and the first and second housing parts 903 and 904. The axial length of the armature chamber 947 is selected to be greater than the axial wall thickness of the armature 946 so as to permit axial movement of the armature 946 within the chamber 947. It will be noted that, upon axial movement of the armature 946, the first sensing piston 938 is moved conjointly therewith. The armature 946 has a plurality of passages 948 therethrough to enable a fluid in the chamber 947 to flow between both sides of the armature 946 as it is axially moved. The piston/armature assembly 938/946 has a central passage 949 therethrough opening into the low pressure chamber 940. The passage 949 is also communicated with the armature chamber 947 through a radial passage.

The first housing part 903 defines therein a central bore 950 slidingly receiving a second sensing piston 951 with a seal ring 952. The piston 951 cooperates with the bore 950 to define a controlled pressure chamber 953 communicated through a passage 954 with a port 955 in the shell 902. The second sensing piston has a circular recess 956 aligned with the central passage 949 and communicated through suitable grooves with the armature chamber 947.

The second sensing piston 951 is subjected to the fluid pressure in the controlled pressure chamber 953. The pressure receptive area of the second sensing piston 951 is selected to be equal to a predetermined multiple of, for example, four times, the pressure receptive are of the first sensing piston 938. The second sensing piston 951 is designed to be brought into contact with the armature 946 in response to the fluid pressure in the controlled pressure chamber 953 and to bias the first piston/armature assembly 938/946 to the right, as viewed in FIG. 16.

In use, the inlet ports 935 of the pressure modulator 900 may be connected via a conduit 960 to the accumulator 34. The port 955 may be connected through a conduit 961 to the master cylinder 12. The outlet port 945 may be connected to the wheel cylinder 144 through a pressure transmission device 962 similar to that shown in the preceding embodiments. The return port 929 may be connected through a conduit 963 to the reservoir 32.

A plurality of pressure modulators 900 may be used, one for each wheel cylinder, as in the foregoing embodiments. Alternatively, in a braking system for a front-engine front-drive vehicle, the outlet passages 942 and 943 of one pressure modulator may be respectively connected to the front right and front left wheel cylinders and the rear wheel cylinders may be connected to the common outlet port 945 of another pressure modulator. In a braking system for a front-engine rear-drive vehicle, it is possible to use two pressure modulators, with the outlet port 945 of one modulator connected in common to the front wheel cylinders and the outlet port of another modulator connected to the rear wheel cylinders.

The operation of the pressure modulator 900 will be described with reference to FIGS. 16 and 17A through 17C.

Figure 17A:
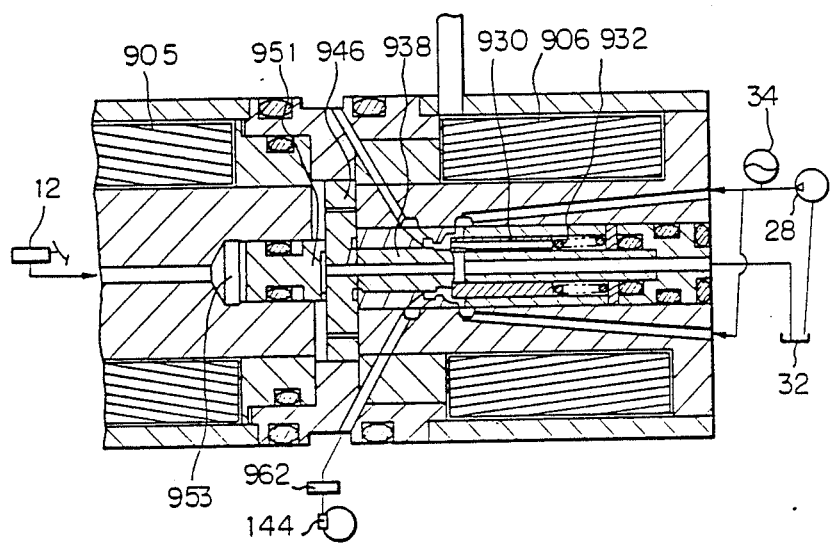
FIGS. 17A, 17B, and 17C are views similar to FIG. 16 but showing the pressure modulator in three different positions, respectively.
Figure 17B:
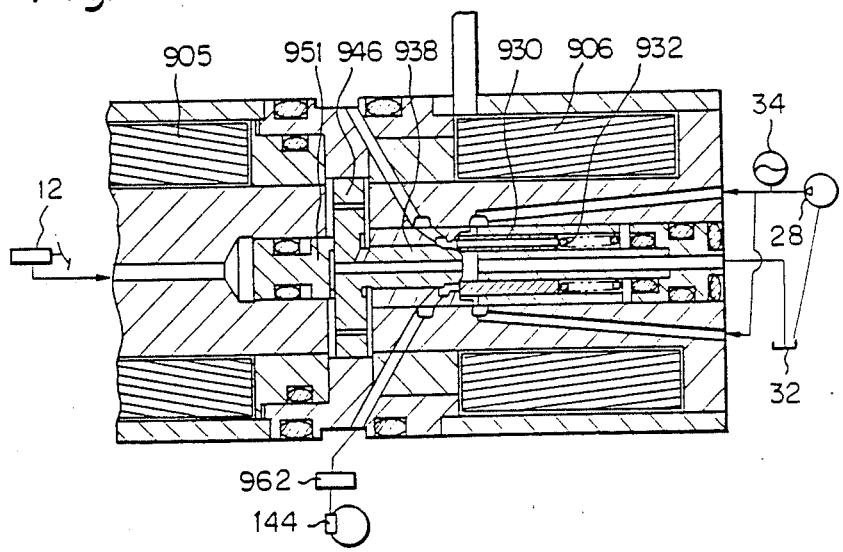
Figure 17C:
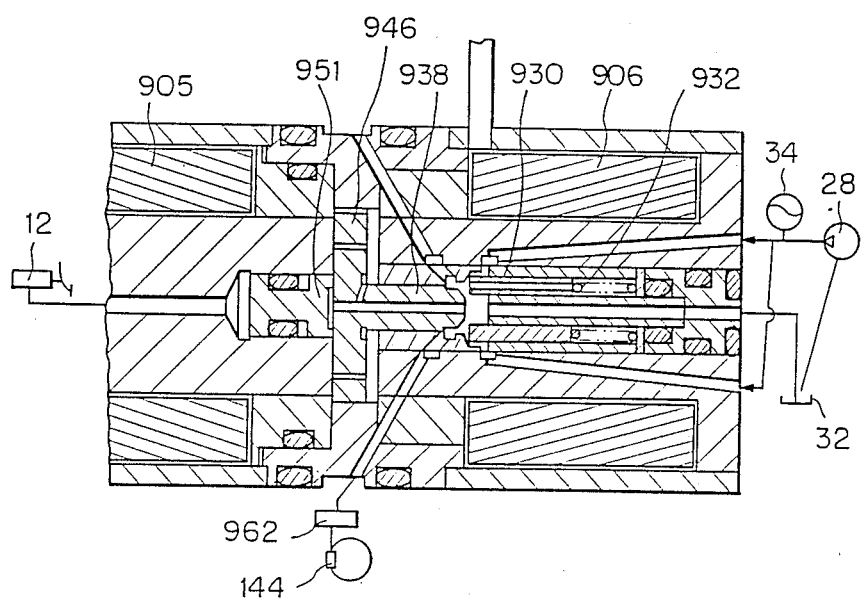

When the master cylinder 12 is not actuated so that the controlled pressure chamber 953 is under a substantially ambient pressure, the first and second sensing pistons 938 and 951 and the valve piston 930 assume the position shown in FIG. 17C. In this position, the outer edge of the valve piston 930 is brought into contact with the valve seat 933 of the first sleeve 919 so as to close fluid communication between the inlet and outlet chambers 934 and 941. The first sensing piston 938 is moved to the left to bring the conical valve seat 939 out of engagement with the inner edge of the valve piston 930, thereby opening fluid communication between the outlet and low pressure chambers 941 and 940. Thus, the wheel cylinder 144 is isolated from the predetermined fluid pressure from the accumulator 34 and, instead, is communicated to the reservoir 32 through the return passages 927 and 928 and the return port 929.

When pressure is exerted on the brake pedal 14, the controlled fluid pressure generated by the master cylinder 12 is communicated through the port 955 and the passage 954 into the controlled pressure chamber 953 to exert a hydrostatic force on the second sensing piston 951. This brings the second sensing piston 951 into contact with the armature/piston assembly 946/938 and causes it to move to the right until the conical valve seat 939 of the first sensing piston 938 is brought into engagement with the inner edge of the valve piston 930 as shown in FIG. 17B. As the second sensing piston 951 urges the assembly 946/938 further, the first sensing piston 938 pushes the valve piston 930 to the right against the action of the spring 932, causing the outer edge of the valve piston 930 to move away from the valve seat 933 as shown in FIG. 17A. This causes a fluid communication between the inlet and outlet chambers 934 and 941, resulting in a rapid pressure rise in the outlet chamber 941. In this position, the fluid pressure from the accumulator is communicated through the outlet passages 942 and 943 to the pressure transmission device 962 to increase the wheel cylinder pressure for brake application.

In the position shown in FIG. 17A, the first sensing piston 938 is exposed to the fluid pressure in the outlet chamber 941 and is subjected to a hydrostatic force which is equal to the fluid pressure multiplied by the pressure receptive area of the piston 938. The pressure rise in the outlet chamber 941 proceeds until the hydrostatic force exerted upon the first sensing piston 938 equals the hydrostatic force exerted upon the second sensing piston 951, whereupon the first and second sensing pistons 938 and 951 as well as the valve piston 930 are moved to the left under the action of the spring 932 until the outer edge of the valve piston 930 comes into engagement with the valve seat 933 as shown in FIG. 17B. This is the balanced position of the first and second sensing pistons 938 and 951. Similar to the pressure modulator 201 shown and described with reference to FIG. 6, in this balanced position, the modulated fluid pressure in the outlet chamber 941 is a predetermined multiple of the controlled fluid pressure in the controlled pressure chamber 953, since the pressure receptive area of the second sensing piston 951 is a predetermined multiple of that of the first sensing piston 938. In the balanced position, the fluid communication between the inlet and outlet chambers 934 and 941 and the communication between the outlet and low pressure chambers 941 and 940 are interrupted so that the wheel cylinder is held at the modulated fluid pressure in the outlet chamber.

When the pressure exerted on the brake pedal is reduced to decrease the fluid pressure from the master cylinder 12, the hydrostatic force acting on the first sensing piston 938 overcomes the hydrostatic force acting on the second sensing piston 951, causing the first sensing piston 93 to move into the position shown in FIG. 17C wherein the fluid communication between the inlet and outlet chambers 934 and 941 is interrupted but the outlet chamber 941 is communicated with the low pressure chamber 940 to allow the fluid pressure in the outlet chamber to be released toward the reservoir 32. In this manner, the modulated fluid pressure communicated to the wheel cylinder is regulated in accordance with the controlled fluid pressure generated by the master cylinder 12. The power brake function is performed since the modulated fluid pressure is the predetermined multiple of the controlled fluid pressure.

The modulated fluid pressure at the outlet chamber 941 of the pressure modulator 900 also may be reduced or increased during an anti-skid or braking force proportioning operation by energizing the first or second solenoid 905 or 906. Similarly, during a traction control operation, the second solenoid 906 may be energized to apply a fluid pressure to the wheel cylinder in the absence of a brake pedal actuation by the operator.

During a braking force proportioning operation, the solenoid 905 or 906 is energized in response to the decrease or increase in the maximum available frictional force of the wheel. When the braking force is to be reduced in response to an aggravated road surface condition, for example, the first solenoid 905 is energized with a current intensity proportional to the decreasing wheel frictional force. This generates magnetic flux through the outer shell 902, the yoke member 909, the armature 946, and the housing part 903 so that the armature 946 is attracted to the left, thereby biasing the piston/armature assembly 938/946 against the hydrostatic force acting on the second sensing piston 951. As a result, the first sensing piston 938 is brought into the balanced position shown in FIG. 17B at a reduced fluid pressure in the outlet chamber 941. The modulated fluid pressure as reduced in this manner is lower than the predetermined multiple of the controlled fluid pressure, and the magnitude of the reduction is proportional to the applied current intensity. Conversely, when the second solenoid 906 is energized with a current intensity proportional to the increasing wheel frictional force, the armature 946 is biased to the right, thereby increasing the output fluid pressure in proportion to the supplied electric power. The increased modulated fluid pressure will be higher than the predetermined multiple of the controlled fluid pressure.

During an anti-skid operation, the first and second solenoids 905 and 906 may be energized alternately with the maximum electric power to cause a rapid reduction and increase in the output pressure.

During a traction control operation, normally the brake pedal 14 is not actuated so that there is no substantial fluid pressure in the controlled pressure chamber 953. Thus, the second solenoid 906 is energized with a current intensity enough to bias the first sensing piston 938 against the fluid pressure in the outlet chamber 941.

The fluid pressure communicated to the wheel cylinder is proportional to the intensity of the electric current applied to the second solenoid.

It will be noted that, in the pressure modulator 900, the second sensing piston 951 is made separate from the first sensing piston 938. This permits the first sensing piston 938 to move more rapidly upon energization of the second solenoid 906, because the movement of the first sensing piston 938 is not hindered by the resistive force which the second sensing piston 951 would encounter.

Since the tube 925 is resiliently supported through the elastomeric ring 926 by the holder 922 which, in turn, is resiliently supported with respect to the second housing part 904, it is easy to accommodate any axial misalignment between the valve piston 930 and the tube 925. This facilitates the fitting of the tube 925 within the valve piston 930 and enables the valve piston to move along the tube with minimum friction, without generating unusual wear therebetween.

Although the present invention has been described herein with reference to the specific embodiments thereof, it is intended that the present invention is not limited thereby and various changes and modifications may be made thereto within the scope of the present invention.

We claim:

1. A braking system for providing an anti-skid function and a braking force proportioning function for a wheeled vehicle, wherein, during anti-skid operation, a fluid pressure communicated to a wheel cylinder of a brake is reduced upon occurrence of a potential wheel skid condition to eliminate the potential wheel skid condition, whereupon said fluid pressure is increased to retard the rotation of the wheel, and wherein, during a braking force proportioning operation, the fluid pressure communicated to the wheel cylinder is controlled in response to a varying load condition imposed upon the wheel or to a varying road surface condition to which the wheel is subjected, said braking system comprising:

the brake, including the wheel cylinder, responsive to a fluid pressure for retarding the rotation of the wheel;

a master cylinder actuated by a vehicle operator for generating a controlled fluid pressure;

a source of a predetermined fluid pressure substantially higher than said controlled fluid pressure;

a reservoir for a brake fluid; and, a pressure modulator in fluid communication with said wheel cylinder, said master cylinder, said source and said reservoir for controlling fluid pressure communicated to said wheel cylinder;

said modulator comprising valve means responsive to said controlled fluid pressure for controlling communication between said source and said wheel cylinder and between said wheel cylinder and said reservoir so that a modulated fluid pressure which is a multiple of said controlled fluid pressure is communicated to said wheel cylinder during normal braking operation;

said modulator also comprising electronically controllable first biasing means responsive to electric control signals for biasing said valve means in such a manner that said modulated fluid pressure communicated to the wheel cylinder is reduced during anti-skid and braking force proportioning operations of the braking system.

2. A braking system according to claim 1, further comprising pressure summation means for receiving the controlled fluid pressure from the master cylinder and the modulated fluid pressure from the pressure modulator and communicating to said wheel cylinder the sum of said controlled and modulated fluid pressures.

3. A braking system according to claim 2, wherein said pressure summation means comprises a body and a double-headed piston movably received therein, said body and said piston cooperating together to define therebetween a controlled pressure chamber in fluid communication with said master cylinder, a modulated pressure chamber normally in fluid communication with said pressure modulator, an output pressure chamber in fluid communication with said wheel cylinder, and a low pressure chamber normally in fluid communication with said reservoir, and wherein said braking system further comprises an electronically controllable switching valve which communicates said pressure modulator with said modulated pressure chamber when deenergized but communicates said pressure modulator with said low pressure chamber when energized, whereby upon energization of the switching valve said pressure summation means communicates to said wheel cylinder a reduced fluid pressure.

4. A braking system according to claim 1, for further providing a traction control function wherein upon occurrence of a potential wheel spin condition the fluid pressure is communicated to the wheel cylinder to eliminate the potential wheel spin condition, and for increasing the braking force of the brake during the braking force proportioning operation in response to an increasing load condition imposed upon the wheel, said pressure modulator further comprising electronically controllable second biasing means responsive to electric control signals for biasing said valve means in such a manner that the fluid pressure is communicated to the wheel cylinder during the traction control operation and that the modulated fluid pressure communicated to the wheel cylinder is increased during the braking force proportioning operation.

5. A braking system according to claim 4, further comprising pressure summation means for receiving the controlled fluid pressure from the master cylinder and the modulated fluid pressure from the pressure modulator and communicating to said wheel cylinder the sum of said controlled and modulated fluid pressures.

6. A braking system according to claim 5, wherein said pressure summation means comprises a body having therein a modulated pressure chamber in fluid communication with said pressure modulator, an output pressure chamber in fluid communication with said wheel cylinder, a controlled pressure chamber in fluid communication with said master cylinder, a low pressure chamber in fluid communication with said reservoir, and a pressure release chamber in fluid communication with said pressure modulator;

said pressure summation means also comprising a first piston movably disposed between said output pressure chamber and said modulated pressure chamber and biased toward said modulated pressure chamber, a second piston movably disposed between said controlled pressure chamber and said low pressure chamber and operable to be brought into engagement with said first piston in response to the controlled fluid pressure in said controlled pressure chamber, and a third piston movably disposed between said output pressure chamber and said pressure release chamber and biased toward said output pressure chamber;

said braking system further comprising a normally-closed shut-off valve disposed between said pressure modulator and said variable volume chamber, said shut-off valve operating to open communication between said pressure modulator and said variable volume chamber during anti-skid operation of the braking system whereby the fluid in said pressure release chamber is released causing said third piston to move toward the pressure release chamber thereby allowing the output pressure chamber to expand and lower the fluid pressure communicated to the wheel cylinder.

7. A braking system according to claim 6, further comprising a normally-open pressure cut-off valve disposed between said master cylinder and said controlled pressure chamber of said pressure summation means, said pressure cut-off valve operating during anti-skid operation of the braking system to close communication between said master cylinder and said controlled pressure chamber to prevent a kick-back of a brake pedal.

8. A braking system according to claim 7, wherein said wheel cylinder is also in fluid communication with the master cylinder, and wherein said braking system further comprises normally-open shut-off valve means responsive to said controlled fluid pressure for interrupting fluid communication between the master cylinder and the wheel cylinder during operation of the braking system and permitting fluid communication therebetween during non-operation of the system to relieve the fluid pressure at the wheel cylinder and/or to allow the brake fluid to flow into the wheel cylinder.

9. A braking system according to claim 5, wherein said pressure modulator is also in fluid communication with said wheel cylinder and said wheel cylinder is also in fluid communication with said reservoir, and wherein said braking system further comprises;

electronically controllable, normally open, first shut-off valve means for permitting fluid communication between the pressure summation means and the wheel cylinder during normal braking and braking force proportioning operations and interrupting the fluid communication therebetween during anti-skid and traction control operations, electronically controllable, normally closed, second shut-off valve means for controlling fluid communication between the pressure modulator and the wheel cylinder so that the modulated fluid pressure from said pressure modulator is communicated to the wheel cylinder to increment the fluid pressure at the wheel cylinder to eliminate the wheel spin condition during traction control operation or to retard the rotation of the wheel during anti-skid operation, and, electronically controllable, normally closed, third shut-off valve means for controlling fluid communication between the wheel cylinder and the reservoir so that the wheel cylinder is communicated with the reservoir to decrement the wheel cylinder pressure to restore the rotation of the wheel during traction control operation or to eliminate the wheel skid condition during anti-skid operation.

10. A braking system according to claim 9, further comprising pressure transmission means for transmitting the modulated fluid pressure from said pressure modulator to said wheel cylinder while preventing the brake fluid from said pressure modulator from flowing into the wheel cylinder.

11. A braking system according to claim 10, further comprising electronically controllable mode change-over valve means for causing said valve means of said pressure modulator to respond to said predetermined fluid pressure thereby to communicate said predetermined fluid pressure to said wheel cylinder upon occurrence of the potential wheel spin condition to eliminate the potential wheel spin condition.

12. A braking system according to claim 5, further comprising electronically controllable mode change-over valve means for causing said valve means of said pressure modulator to respond to said predetermined fluid pressure thereby to communicate said predetermined fluid pressure to said wheel cylinder upon occurrence of the potential wheel spin condition to eliminate the potential wheel spin condition, said pressure modulator being also in fluid communication with said wheel cylinder, and said wheel cylinder being also in fluid communication with said reservoir, said braking system further comprising;

electronically controllable switching valve means for permitting fluid communication between the pressure summation means and the wheel cylinder but interrupting fluid communication between the pressure modulator and the wheel cylinder during normal braking and braking force proportioning operations and interrupting fluid communication between the pressure summation means and the wheel cylinder but permitting fluid communication between the pressure modulator and the wheel cylinder during anti-skid and traction control operations, electronically controllable, normally-open shut-off valve means for controlling fluid communication between the pressure modulator and the pressure summation means in such a manner that the modulated fluid pressure from said pressure modulator is communicated to the pressure summation means to increment the fluid pressure at the wheel cylinder to eliminate the wheel spin condition during traction control operation or to retard the rotation of the wheel during anti-skid operation, and, electronically controllable, normally closed shut-off valve means for controlling fluid communication between the wheel cylinder and the reservoir in such a manner that the wheel cylinder is communicated to the reservoir to decrement the wheel cylinder pressure to restore the rotation of the wheel during traction control operation or to eliminate the wheel skid condition during anti-skid operation.

13. A braking system according to claim 12, wherein said pressure summation means comprises a body having therein a modulated pressure chamber in fluid communication with said pressure modulator, an output pressure chamber in fluid communication with said wheel cylinder, and a controlled pressure chamber in fluid communication with said master cylinder, said pressure summation means also comprising a first piston movably disposed between said output pressure chamber and said modulated pressure chamber and biased toward said modulated pressure chamber, and a second piston movably disposed in said controlled pressure chamber and operable to be brought into engagement with said first piston in response to the controlled fluid pressure in said controlled pressure chamber.

14. A braking system according to claim 4, wherein said wheel cylinder is also in fluid communication with said master cylinder and wherein said braking system further comprises pressure-responsive normally-open shut-off valve means responsive to the modulated fluid pressure from said pressure modulator for allowing said fluid communication between said master cylinder and said wheel cylinder in the absence of said modulated fluid pressure and interrupting said fluid communication in the presence of said modulated pressure.

15. A braking system according to claim 14, further comprising pressure transmission means for transmitting the modulated fluid pressure from said pressure modulator to said wheel cylinder while preventing the brake fluid from said pressure modulator from flowing into the wheel cylinder.

16. A braking system according to claim 15, further comprising a variable volume chamber device, said device having a variable volume chamber defined by a spring biased plunger and being in fluid communication with said master cylinder, the volume of said chamber varying in response to the magnitude of the controlled fluid pressure to permit the brake fluid from the master cylinder to flow into and out of the variable volume chamber whereby substantial travel of a brake pedal is provided to allow the vehicle operator to press down the brake pedal when said shut-off valve is closed.

17. A braking system according to claim 4, wherein said wheel cylinder is also in fluid communication with said master cylinder,
said braking system further comprising switching valve means responsive to a differential pressure between said predetermined fluid pressure and said controlled fluid pressure for communicating the modulated fluid pressure from the pressure modulator to the wheel cylinder when said predetermined fluid pressure is higher than said controlled pressure and communicating the controlled fluid pressure from the master cylinder to the wheel cylinder when said predetermined fluid pressure is lower than said controlled fluid pressure.

18. A braking system according to claim 17, further comprising pressure transmission means for transmitting the modulated fluid pressure from the pressure modulator to the wheel cylinder while preventing the brake fluid from the pressure modulator from flowing into the wheel cylinder.

19. A braking system according to claim 18, wherein said wheel cylinder is also in fluid communication with a fluid reservoir of the master cylinder, said braking system further comprising normally open cut-off valve means cooperating with said pressure transmission means for permitting fluid communication between the wheel cylinder and the fluid reservoir of the master cylinder during non-operation of the braking system to relieve the fluid pressure at the wheel cylinder and/or to allow the brake fluid to flow into the wheel cylinder, said cut-off valve means cooperating with said pressure transmission means during operation of the system to interrupt fluid communication between the wheel cylinder and the master cylinder reservoir.

20. A braking system according to claim 18, further comprising normally open first cut-off valve means cooperating with said pressure transmission means for permitting fluid communication between the master cylinder and the wheel cylinder during non-operation of the braking system and interrupting fluid communication therebetween during operation of the system, said braking system further comprising normally open second cut-off valve means responsive to said controlled fluid pressure to interrupt fluid communication between the master cylinder and the wheel cylinder.

21. A braking system for providing a braking force proportioning function for a vehicle having at least two wheels, which comprises:
at least two brakes, including wheel cylinders, responsive to a fluid pressure to retard the rotation of the wheels;
a master cylinder actuated by a vehicle operator for generating a controlled fluid pressure;
a source of a predetermined fluid pressure substantially higher than said controlled fluid pressure;
a reservoir for a brake fluid;
at least two pressure modulators in fluid communication with said wheel cylinders, said master cylinder, said source and said reservoir for respectively controlling fluid pressures communicated to respective wheel cylinders;
each of said pressure modulator comprising;
valve means responsive to said controlled fluid pressure for controlling fluid communication between said source and associated wheel cylinder and between said reservoir and associated wheel cylinder so that a modulated fluid pressure which is a multiple of said controlled fluid pressure is communicated to associated wheel cylinder during normal braking operation;
electronically controllable first biasing means for biasing said valve means so that said modulated fluid pressure communicated to associated wheel cylinder is reduced upon energization of said first biasing means; and,
electronically controllable second biasing means for controlling fluid communication between said source and associated wheel cylinder and between said reservoir and associated wheel cylinder so that said modulated fluid pressure communicated to associated wheel cylinder is increased upon energization of said second biasing means;
sensing means associated with the wheels for sensing load conditions imposed upon respective wheels and delivering signals in accordance with the load conditions; and,
control means responsive to said signals and cooperating with said first and second biasing means for controlling said first and second biasing means so that fluid pressures communicated from said pressure modulators to respective wheel cylinders are proportioned in accordance with the load conditions at said wheels during braking force proportioning operation of the braking system.

22. A braking system for providing a braking force proportioning function for a vehicle having at least two wheels, which comprises:
at least two brakes, including wheel cylinders, responsive to a fluid pressure to retard the rotation of the wheels;
a master cylinder actuated by a vehicle operator for generating a controlled fluid pressure;
a source of a predetermined fluid pressure substantially higher than said controlled fluid pressure;
a reservoir for a brake fluid;

at least two pressure modulators in fluid communication with said wheel cylinders, said master cylinder, said source and said reservoir for respectively controlling fluid pressures communicated to respective wheel cylinders;

each of said pressure modulators comprising;

valve means responsive to said controlled fluid pressure for controlling fluid communication between said source and associated wheel cylinder and between said reservoir and associated wheel cylinder so that a modulated fluid pressure which is a multiple of said controlled fluid pressure is communicated to associated wheel cylinder during normal braking operation;

electronically controllable first biasing means for biasing said valve means so that said modulated fluid pressure communicated to associated wheel cylinder is reduced upon energization of said first biasing means; and, electronically controllable second biasing means for controlling fluid communication between said source and associated wheel cylinder and between said reservoir and associated wheel cylinder so that said modulated fluid pressure communicated to associated wheel cylinder is increased upon energization of said second biasing means;

sensing means associated with the wheels for sensing the rotational speeds of the wheels and delivering signals in accordance with the speeds; and, control means responsive to said signals and cooperating with said first and second biasing means for sensing a potential wheel skid condition and controlling said first and second biasing means so that fluid pressures communicated from said pressure modulators to respective wheel cylinders are proportioned in accordance with the potential wheel skid conditions at said wheels during braking force proportioning operation of the braking system to avoid the potential wheel skid condition.

23. A braking system for providing a braking force proportioning function for a vehicle having at least two wheels, which comprises:

at least two brakes, including wheel cylinders, responsive to a fluid pressure to retard the rotation of the wheels;

a master cylinder actuated by a vehicle operator for generating a controlled fluid pressure;

a source of a predetermined fluid pressure substantially higher than said controlled fluid pressure;

a reservoir for a brake fluid;

at least two pressure modulators in fluid communication with said wheel cylinders, said master cylinder, said source and said reservoir for respectively controlling fluid pressures communicated to respective wheel cylinders;

each of said pressure modulators comprising;

valve means responsive to said controlled fluid pressure for controlling fluid communication between said source and associated wheel cylinder and between said reservoir and associated wheel cylinder so that a modulated fluid pressure which is a multiple of said controlled pressure is communicated to associated wheel cylinder during normal braking operation;

electronically controllable first biasing means for biasing said valve means so that said modulated fluid pressure communicated to associated wheel cylinder is reduced upon energization of said first biasing means; and, electronically controllable second biasing means for controlling fluid communication between said source and associated wheel cylinder and between said reservoir and associated wheel cylinder so that said modulated fluid pressure communicated to associated wheel cylinder is increased upon energization of said second biasing means;

sensing means associated with the wheels for sensing the rotational speeds of the wheels and delivering signals in accordance with the speeds; and, control means responsive to said signals and cooperating with said first and second biasing means for sensing a potential wheel spin condition and controlling said first and second biasing means so that fluid pressures communicated from said pressure modulators to respective wheel cylinders are proportioned in accordance with the potential wheel skid conditions at said wheels during braking force proportioning operation of the braking system to avoid the potential wheel spin condition.

24. A braking system according to one of claims 1 through 3, wherein said pressure modulator comprises:

a housing having therein an inlet chamber, an outlet chamber, a controlled pressure chamber, a low pressure chamber, and an output pressure chamber, said inlet chamber being in fluid communication with said outlet chamber, said low pressure chamber being in fluid communication with said output pressure chamber;

means for communicating said inlet chamber with said source of the predetermined fluid pressure;

means for communicating said outlet chamber with said wheel cylinder;

means for communicating said controlled pressure chamber with said master cylinder;

means for communicating said outlet chamber with said output pressure chamber;

means for communicating said low pressure chamber with said reservoir;

first flow control means for controlling fluid communication between said inlet and outlet chambers;

second flow control means for controlling fluid communication between said output pressure and low pressure chambers;

a valve member responsive to fluid pressure in said outlet and controlled pressure chambers and cooperating with said first and second flow control means for regulating fluid communication between said inlet and outlet chambers and between said output pressure and low pressure chambers, said valve member having for said controlled pressure chamber a pressure receptive area which is a multiple of a pressure receptive area for said outlet chamber member so that fluid pressure communicated to the wheel cylinder is a multiple of the controlled fluid pressure during generation of the controlled fluid pressure; and, solenoid means, including a solenoid coil mounted to the housing and an armature integral with said valve member, for biasing the valve member against fluid pressure in said controlled pressure chamber.

25. A braking system according to one of claims 4 through 23, wherein said pressure modulator comprises:

a housing having therein an inlet chamber, an outlet chamber, a controlled pressure chamber, a low pressure chamber, and an output pressure chamber, said inlet chamber being in fluid communication with said outlet chamber, said low pressure chamber being in fluid communication with said outlet chamber;

means for communicating said inlet chamber with said source of the predetermined fluid pressure;

means for communicating said outlet chamber with said wheel cylinder;

means for communicating said controlled pressure chamber with said master cylinder;

means for communicating said outlet chamber with said output pressure chamber;

means for communicating said low pressure chamber with said reservoir;

a valve member responsive to fluid pressure in said output pressure and controlled pressure chambers for regulating fluid communication between said inlet and outlet chambers and between said outlet and low pressure chambers, said valve member having for said controlled pressure chamber a pressure receptive area which is a multiple of a pressure receptive area for said output pressure chamber member so that fluid pressure communicated to the wheel cylinder is a multiple of the controlled fluid pressure during generation of the controlled fluid pressure;

first solenoid means, including a first solenoid coil mounted to the housing and an armature integral with said valve member, for biasing the valve member against fluid pressure in said controlled pressure chamber to reduce fluid pressure communicated to the wheel cylinder when energized; and, second solenoid means, including a second solenoid coil mounted to the housing and the armature, for biasing the valve member against fluid pressure in said output pressure chamber to increase fluid pressure communicated to the wheel cylinder when energized.

26. A braking system according to one of claims 4 through 23, wherein said pressure modulator comprises:

a housing having therein a stepped bore, an inlet chamber, an outlet chamber, a controlled pressure chamber, and a low pressure chamber, said inlet chamber being in fluid communication with said outlet chamber, said low pressure chamber being in fluid communication with said outlet chamber, said housing also having a valve seat formed between a large diameter section and a small diameter section of said stepped bore;

means for communicating said inlet chamber with said source of the predetermined fluid pressure;

means for communicating said outlet chamber with said wheel cylinder;

means for communicating said controlled pressure chamber with said master cylinder;

means for communicating said low pressure chamber with said reservoir;

a valve member movably received in the large diameter section of the bore and spring-biased into sealing engagement with the valve seat to control fluid communication between the inlet and outlet chambers;

a first sensing piston movably received in the small diameter section of the bore and responsive to fluid pressure in the outlet chamber to cooperate with the valve member to control fluid communication between the outlet and low pressure chambers and to control the position of the valve member;

a second sensing piston responsive to fluid pressure in the controlled pressure chamber to urge the first sensing piston into engagement with the valve member, causing the valve member to move away from the valve seat to permit fluid communication between the inlet and outlet chambers;

said second sensing piston having a pressure receptive area which is a multiple of a pressure receptive area of the first sensing piston so that fluid pressure communicated to the wheel cylinder is a multiple of the controlled fluid pressure during generation of the controlled fluid pressure;

first solenoid means, including a first solenoid coil mounted to the housing and an armature integral with said valve member, for biasing the first sensing piston to move against the force of the second sensing piston to reduce fluid pressure communicated to the wheel cylinder when energized, and, second solenoid means, including a second solenoid coil mounted to the housing and the armature, for biasing the first sensing piston against fluid pressure in the outlet chamber to increase fluid pressure communicated to the wheel cylinder when energized.

27. A pressure modulator for modulating a fluid pressure communicated to a hydraulic device, which comprises:

a housing having therein a controlled pressure chamber communicated with a source of a controlled fluid pressure, an inlet chamber communicated with a source of a predetermined fluid pressure substantially higher than said controlled fluid pressure, an outlet chamber communicated with said hydraulic device, a low pressure chamber communicated with a reservoir for a hydraulic fluid, and an output pressure chamber communicated with said outlet chamber, said low pressure chamber being in fluid communication with said output pressure chamber, said inlet chamber being in fluid communication with said outlet chamber;

first flow control means for controlling fluid communication between said inlet and outlet chambers;

second flow control means for controlling fluid communication between said output pressure and low pressure chambers;

a valve member responsive to fluid pressure in said outlet and controlled pressure chambers and cooperating with said first and second flow control means for regulating fluid communication between said inlet and outlet chambers and between said output pressure and low pressure chambers, said valve member having for said controlled pressure chamber a pressure receptive area which is a multiple of a pressure receptive area for said outlet chamber member so that fluid pressure communicated to the hydraulic device is a multiple of the controlled fluid pressure; and, solenoid means, including a solenoid coil mounted to the housing and an armature integral with said valve member, for biasing the valve member against fluid pressure in said controlled pressure chamber.

28. A pressure modulator for modulating a fluid pressure communicated to a hydraulic device, which comprises:

a housing having therein a controlled pressure chamber communicated with a source of a controlled fluid pressure, an inlet chamber communicated with a source of a predetermined fluid pressure substantially higher than said controlled fluid pressure, an outlet chamber communicated with said hydraulic device, a low pressure chamber communicated with a reservoir for a hydraulic fluid, and an output pressure chamber communicated with said outlet chamber, said inlet chamber being in fluid communication with said outlet chamber, said low pressure chamber being in fluid communication with said outlet chamber;

a valve member responsive to fluid pressure in said output pressure and controlled pressure chambers for regulating fluid communication between said inlet and outlet chambers and between said outlet and low pressure chambers, said valve member having for said controlled pressure chamber a pressure receptive area which is a multiple of a pressure receptive area for said output pressure chamber member so that fluid pressure communicated to the hydraulic device is a multiple of the controlled fluid pressure;

first solenoid means, including a first solenoid coil mounted to the housing and an armature integral with said valve member, for biasing the valve member against fluid pressure in said controlled pressure chamber to reduce fluid pressure communicated to the hydraulic device when energized; and, second solenoid means, including a second solenoid coil mounted to the housing and the armature, for biasing the valve member against fluid pressure in said output pressure chamber to increase fluid pressure communicated to the hydraulic device when energized.

29. A pressure modulator for modulating a fluid pressure communicated to a hydraulic device, which comprises:

a housing having therein a stepped bore, a controlled pressure chamber communicated with a source of a controlled fluid pressure, an inlet chamber communicated with a source of a predetermined fluid pressure substantially higher than said controlled fluid pressure, an outlet chamber communicated with the hydraulic device, and a low pressure chamber communicated with a reservoir for a hydraulic fluid, said inlet chamber being in fluid communication with said outlet chamber, said low pressure chamber being in fluid communication with said outlet chamber, said housing also having a valve seat formed between a large diameter section and a small diameter section of said stepped bore;

a valve member movably received in the large diameter section of the bore and spring-biased into sealing engagement with the valve seat to control fluid communication between the inlet and outlet chambers;

a first sensing piston movably received in the small diameter section of the bore and responsive to fluid pressure in the outlet chamber to cooperate with the valve member to control fluid communication between the outlet and low pressure chambers and to control the position of the valve member;

a second sensing piston responsive to fluid pressure in the controlled pressure chamber to urge the first sensing piston into engagement with the valve member, causing the valve member to move away from the valve seat to permit fluid communication between the inlet and outlet chambers;

said second sensing piston having a pressure receptive area which is a multiple of a pressure receptive area of the first sensing piston so that fluid pressure communicated to the hydraulic device is a multiple of the controlled fluid pressure;

first solenoid means, including a first solenoid coil mounted to the housing and an armature integral with said valve member, for biasing the first sensing piston to move against the force of the second sensing piston to reduce fluid pressure communicated to the hydraulic device when energized; and, second solenoid means, including a second solenoid coil mounted to the housing and the armature, for biasing the first sensing piston against fluid pressure in the outlet chamber to increase fluid pressure communicated to the hydraulic device when energized.

* * * * *